United States Patent
Nakajima et al.

(10) Patent No.: US 10,266,639 B2
(45) Date of Patent: Apr. 23, 2019

(54) POLYISOCYANATE COMPOSITION, METHOD FOR PRODUCING THE SAME, COATING COMPOSITION, AQUEOUS COATING COMPOSITION, AND COATED SUBSTRATE

(71) Applicant: ASAHI KASEI KABUSHIKI KAISHA, Tokyo (JP)

(72) Inventors: Kazuko Nakajima, Tokyo (JP); Shinichiro Watanabe, Tokyo (JP); Shigetoshi Otoyama, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/546,705

(22) PCT Filed: Feb. 2, 2016

(86) PCT No.: PCT/JP2016/052996
§ 371 (c)(1),
(2) Date: Jul. 27, 2017

(87) PCT Pub. No.: WO2016/125769
PCT Pub. Date: Aug. 11, 2016

(65) Prior Publication Data
US 2018/0016386 A1 Jan. 18, 2018

(30) Foreign Application Priority Data
Feb. 4, 2015 (JP) .................... 2015-020671

(51) Int. Cl.
| C09D 5/02 | (2006.01) |
| C08G 18/02 | (2006.01) |
| C08G 18/10 | (2006.01) |
| C08G 18/18 | (2006.01) |
| C08G 18/22 | (2006.01) |
| C08G 18/28 | (2006.01) |
| C08G 18/42 | (2006.01) |
| C08G 18/48 | (2006.01) |
| C08G 18/62 | (2006.01) |
| C08G 18/70 | (2006.01) |
| C08G 18/78 | (2006.01) |
| C08G 18/79 | (2006.01) |
| C09D 175/04 | (2006.01) |
| C09D 175/08 | (2006.01) |

(52) U.S. Cl.
CPC ........... *C08G 18/79* (2013.01); *C08G 18/022* (2013.01); *C08G 18/10* (2013.01); *C08G 18/1875* (2013.01); *C08G 18/225* (2013.01); *C08G 18/283* (2013.01); *C08G 18/2825* (2013.01); *C08G 18/4277* (2013.01); *C08G 18/4833* (2013.01); *C08G 18/6283* (2013.01); *C08G 18/706* (2013.01); *C08G 18/7837* (2013.01); *C08G 18/792* (2013.01); *C09D 5/02* (2013.01); *C09D 175/04* (2013.01); *C09D 175/08* (2013.01); *C08G 2105/02* (2013.01)

(58) Field of Classification Search
CPC .... C08G 18/79; C08G 18/10; C08G 18/4833; C08G 18/7837; C08G 18/022; C08G 18/792; C08G 18/4277; C08G 18/706; C08G 18/6283; C08G 18/283; C08G 18/2825; C08G 18/225; C08G 18/1875; C08G 2105/02; C09D 175/08; C09D 5/02; C09D 175/04
See application file for complete search history.

(56) References Cited

U.S. PATENT DOCUMENTS

| 5,252,696 A | 10/1993 | Laas et al. |
| 5,852,111 A | 12/1998 | Wanatabe et al. |
| 6,777,523 B1 | 8/2004 | Laas et al. |

FOREIGN PATENT DOCUMENTS

| JP | H05-222150 A | 8/1993 |
| JP | H10-176031 A | 6/1998 |
| JP | 2000-248044 A | 9/2000 |
| JP | 2003-147042 A | 5/2003 |
| JP | 2003-515639 A | 5/2003 |
| JP | 2013-136731 A | 7/2013 |

OTHER PUBLICATIONS

Supplementary European Search Report for copending family member EP 16 74 6600 dated Dec. 12, 2017.
International Search Report from Patent Application No. PCT/JP2016/052996, dated Apr. 19, 2016.
International Preliminary Report on Patentability Patent Application No. PCT/JP2016/052996, dated Aug. 8, 2017.
Written Opinion of the International Searching Authority on Patent Application No. PCT/JP2016/052996, dated Apr. 14 2016.

*Primary Examiner* — Rabon A Sergent
(74) *Attorney, Agent, or Firm* — Greenblum & Bernstein, P.L.C.

(57) ABSTRACT

The present invention provides a polyisocyanate composition comprising a modified polyisocyanate obtained by a reaction between a polyisocyanate and a polyalkylene glycol alkyl ether having a specific structure. In the polyisocyanate composition, the average number of isocyanate functional groups is 1.8 or more and 4.0 or less, the moiety derived from the polyalkylene glycol alkyl ether in the modified polyisocyanate is contained in an amount of 10 mass % or more and 18 mass % or less based on the total amount of the polyisocyanate composition, and the polydispersity index of molecular weight distribution of the moiety derived from the polyalkylene glycol alkyl ether in the modified polyisocyanate is 1.05 or more and 2.00 or less.

20 Claims, No Drawings

POLYISOCYANATE COMPOSITION, METHOD FOR PRODUCING THE SAME, COATING COMPOSITION, AQUEOUS COATING COMPOSITION, AND COATED SUBSTRATE

TECHNICAL FIELD

The present invention relates to a polyisocyanate composition, a method for producing the same, a coating composition, an aqueous coating composition, and a coated substrate.

BACKGROUND ART

In recent years, two-component urethane coating compositions used as solvent-based paints have been required to be aqueous from the viewpoint of environmental protection. However, polyisocyanates, which are used as curing agents in two-component urethane coating compositions, are poorly dispersible in and highly reactive with water, and their reaction with water produces carbon dioxide. Thus, there have been developed polyisocyanates that have emulsifiability and whose isocyanate groups do not readily react with water even when they are dispersed in water.

For example, Patent Literature 1 discloses a water-dispersible polyisocyanate mixture containing a polyisocyanate compound and a polyether containing an ethylene oxide unit. Patent Literature 2 discloses a polyisocyanate composition that is easily dispersible in water, the polyisocyanate composition being obtained by a reaction between a prepolymer formed from an aliphatic or alicyclic diisocyanate and a nonionic hydrophilic component made up of an average of 3.0 to 4.9 ethylene oxide repeating units. Patent Literature 3 discloses a polyisocyanate composition obtained by a reaction with a nonionic hydrophilic component having at least one hydroxy group and made up of 3 to 50 ethylene oxide repeating units and a long-chain polyol component having a number-average molecular weight of 1000 to 15000.

CITATION LIST

Patent Literature

Patent Literature 1: Japanese Patent Laid-Open No. 05-222150
Patent Literature 2: Japanese Patent Laid-Open No. 2000-248044
Patent Literature 3: Japanese Patent Laid-Open No. 2003-147042

SUMMARY OF INVENTION

Technical Problem

Aqueous two-component urethane coating compositions are applied to furniture, building materials, residential wood products, gym floors, and wooden floors of houses and schools. In such uses, the two-component urethane coating composition to be applied is often prepared on site; therefore, a powerful stirrer cannot be used in many cases. Insufficient stirring causes a polyisocyanate, which is used as a curing agent, to fail to disperse in a primary component. This leads to deterioration in the appearance of the applied coating, and also adversely affects the physical properties of the coating. There is therefore a demand for an aqueous two-component urethane coating composition capable of being dispersed in a primary component with a low stirring intensity and of providing good coating appearance.

To disperse an aqueous two-component urethane coating composition in a primary component, it is necessary to modify a large number of hydrophilic groups of a polyisocyanate and thereby impart emulsifiability. The modification of a large number of hydrophilic groups of the polyisocyanate, however, unfortunately leads to a decrease in the water resistance of the resulting coating.

The polyisocyanate composition disclosed in Patent Literature 1 cannot be sufficiently dispersed in a primary component by low-intensity stirring and cannot provide satisfactory coating appearance. The polyisocyanate compositions disclosed in Patent Literature 2 and 3 have disadvantages in terms of achieving both high water resistance and good appearance of coatings.

It is therefore an object of the present invention to provide a polyisocyanate composition that allows good appearance of a coating to be achieved with stirring at low intensity and also allows the coating to have high water resistance.

Solution to Problem

The present inventors have completed the present invention on the basis of the finding that a polyisocyanate composition that comprises a specific modified polyisocyanate obtained by a reaction between a polyisocyanate and a polyalkylene glycol alkyl ether having a specific structure and in which the average number of isocyanate functional groups is in a specific range allows good appearance of a coating to be achieved with stirring at low intensity and also allows the coating to have high water resistance.

Specifically, the present invention is as follows.

[1]
A polyisocyanate composition comprising a modified polyisocyanate obtained by a reaction between a polyisocyanate and a polyalkylene glycol alkyl ether represented by following general formula (1):

wherein $R_1$ is an alkylene group having 1 to 4 carbon atoms, $R_2$ is an alkyl group having 1 to 4 carbon atoms, and an average of n is 5.0 or more and 20 or less, wherein
an average number of isocyanate functional groups is 1.8 or more and 4.0 or less,
a moiety derived from the polyalkylene glycol alkyl ether in the modified polyisocyanate is contained in an amount of 10 mass % or more and 18 mass % or less based on the total amount of the polyisocyanate composition, and
a polydispersity index of molecular weight distribution of the moiety derived from the polyalkylene glycol alkyl ether in the modified polyisocyanate is 1.05 or more and 2.00 or less.

[2]
The polyisocyanate composition according to [1], wherein the polydispersity index of molecular weight distribution is 1.05 or more and 1.50 or less.

[3]
The polyisocyanate composition according to [1] or [2], wherein in the formula (1), $R_1$ is an ethylene group and the average of n is 5.0 or more and 15 or less.

[4]

The polyisocyanate composition according to any of [1] to [3], wherein the polyalkylene glycol alkyl ether comprises two or more polyalkylene glycol alkyl ethers represented by the formula (1) and differing in the average of n.

[5]

The polyisocyanate composition according to any of [1] to [4], further comprising a hindered phenolic compound.

[6]

A method for producing a polyisocyanate composition, comprising a reaction step of reacting a polyisocyanate and a polyalkylene glycol alkyl ether represented by following general formula (2):

(2)

wherein $R_1$ is an alkylene group having 1 to 4 carbon atoms, $R_2$ is an alkyl group having 1 to 4 carbon atoms, and an average of n is 5.0 or more and 20 or less to obtain a polyisocyanate composition comprising a modified polyisocyanate, wherein the reaction step is performed to obtain the polyisocyanate composition in which an average number of isocyanate functional groups is 1.8 or more and 4.0 or less, a moiety derived from the polyalkylene glycol alkyl ether in the modified polyisocyanate is contained in an amount of 10 mass % or more and 18 mass % or less based on the total amount of the polyisocyanate composition, and a polydispersity index of molecular weight distribution of the moiety derived from the polyalkylene glycol alkyl ether in the modified polyisocyanate is 1.05 or more and 2.00 or less.

[7]

The method for producing a polyisocyanate composition according to [6], wherein the polydispersity index of molecular weight distribution is 1.05 or more and 1.50 or less.

[8]

The method for producing a polyisocyanate composition according to [6] or [7], wherein in the formula (2), $R_1$ is an ethylene group and the average of n is 5.0 or more and 15 or less.

[9]

The method for producing a polyisocyanate composition according to any of [6] to [8], wherein the polyalkylene glycol alkyl ether comprises two or more polyalkylene glycol alkyl ethers represented by the formula (2) and differing in the average of n.

[10]

A coating composition comprising the polyisocyanate composition according to any of [1] to [5].

[11]

An aqueous coating composition comprising the coating composition according to [10] and water.

[12]

A coated substrate comprising a substrate and a coating film coating the substrate, the coating film being formed from the coating composition according to [10] or from the aqueous coating composition according to [11].

Advantageous Effect of Invention

With the use of the polyisocyanate composition according to the present invention, good appearance of a coating can be achieved with stirring at low intensity, and the coating can have high water resistance.

DESCRIPTION OF EMBODIMENTS

An embodiment of the present invention (which will hereinafter be referred to as "the present embodiment") will now be described in detail. The present embodiment described below is an example for illustrating the present invention and is not intended to limit the present invention thereto. The present invention can be carried out with appropriate modifications falling within the gist of the present invention.

[Polyisocyanate Composition]

The polyisocyanate composition according to the present embodiment comprises a modified polyisocyanate obtained by a reaction between a polyisocyanate and a polyalkylene glycol alkyl ether represented by the general formula (1) below. In the polyisocyanate composition, the average number of isocyanate functional groups is 1.8 or more and 4.0 or less, and a moiety derived from the polyalkylene glycol alkyl ether in the modified polyisocyanate is contained in an amount of 10 mass % or more and 18 mass % or less based on the total amount (100 mass %) of the polyisocyanate composition. Furthermore, in the modified polyisocyanate, the polydispersity index of molecular weight distribution of the moiety derived from the polyalkylene glycol alkyl ether is 1.05 or more and 2.00 or less.

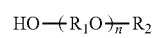
(1)

(In the formula (1), $R_1$ is an alkylene group having 1 to 4 carbon atoms and $R_2$ is an alkyl group having 1 to 4 carbon atoms. The average of n is 5.0 or more and 20 or less.)

The polyisocyanate composition according to the present embodiment may comprise the polyisocyanate unreacted with the polyalkylene glycol alkyl ether (which hereinafter may be referred to as "unreacted polyisocyanate") and the polyalkylene glycol alkyl ether unreacted with the polyisocyanate (which hereinafter may be referred to as "unreacted polyalkylene glycol alkyl ether"). The various physical properties or characteristics of the polyisocyanate composition of the present embodiment, which will be described below, should be considered to include those exhibited when the composition comprises the modified polyisocyanate obtained by a reaction with the polyalkylene glycol alkyl ether (which hereinafter may be simply referred to as "modified polyisocyanate") and the unreacted polyisocyanate, unless otherwise specified.

The ratio between the unreacted polyisocyanate and the modified polyisocyanate in the polyisocyanate composition of the present embodiment can be determined by measurement using liquid chromatography.

<Polyisocyanate>

Examples of the polyisocyanate of the present embodiment include, but are not limited to: at least one diisocyanate compound selected from an aliphatic diisocyanate, an alicyclic diisocyanate, and an aromatic diisocyanate; and polyisocyanate compounds derived from these diisocyanate compounds. The polyisocyanate used in the present embodiment is preferably at least one diisocyanate compound selected from the group consisting of an aliphatic polyisocyanate, an alicyclic polyisocyanate, and an aromatic polyisocyanate in terms of industrial availability.

Examples of the aliphatic diisocyanate include, but are not limited to, 1,4-diisocyanatobutane, 1,5-diisocyanatopentane, ethyl (2,6-diisocyanato)hexanoate, 1,6-diisocyanatohexane (which hereinafter may be referred to as "HDI"), 1,9-diisocyanatononane, 1,12-diisocyanatododecane, and 2,2,4- or 2,4,4-trimethyl-1,6-diisocyanatohexane.

Examples of the alicyclic diisocyanate include, but are not limited to, 1,3- or 1,4-bis(isocyanatomethyl)cyclohexane (which hereinafter may be referred to as "hydrogenated XDI"), 1,3- or 1,4-diisocyanatocyclohexane, 3,5,5-trimethyl-1-isocyanato-3-(isocyanatomethyl)cyclohexane (which hereinafter may be referred to as "IPDI"), 4-4'-diisocyanato-dicyclohexylmethane (which hereinafter may be referred to as "hydrogenated MDI"), and 2,5- or 2,6-diisocyanatomethylnorbornane.

Examples of the aromatic diisocyanate include, but are not limited to, xylylene diisocyanate, tolylene diisocyanate, and diphenylmethane diisocyanate.

Among these, HDI, IPDI, hydrogenated XDI, and hydrogenated MDI are more preferred, since they are less prone to yellowing.

Examples of polyisocyanates derived from the above diisocyanates include, but are not limited to: a polyisocyanate compound having a uretdione structure resulting from cyclization and dimerization of two isocyanate groups; a polyisocyanate compound having an isocyanurate structure resulting from cyclization and trimerization of three isocyanate groups and an iminoxadiazinedione structure; a polyisocyanate compound having a biuret structure resulting from a reaction of three isocyanate groups with one water molecule; a polyisocyanate compound having an oxadiazinetrione structure resulting from a reaction of two isocyanate groups with one carbon dioxide molecule; a polyisocyanate compound having two or more urethane groups each resulting from a reaction of one isocyanate group with one hydroxy group; a polyisocyanate compound having an allophanate structure resulting from a reaction of two isocyanate groups with one hydroxy group; a polyisocyanate compound having an acyl urea group resulting from a reaction of one isocyanate group with one carboxyl group; and a polyisocyanate compound having a urea structure resulting from a reaction of one isocyanate group with one primary or secondary amine. Other examples include aliphatic triisocyanates such as 1,3,6-triisocyanatohexane, 1,8-diisocyanato-4-isocyanatomethyloctane, and 2-isocyanatoethyl-2,6-diisocyanato-hexanoate. The term "polyisocyanate compound" as used herein refers to a compound comprising a polyisocyanate resulting from a reaction with a compound other than diisocyanate (such as alcohol, water, and amine).

These polyisocyanates may be modified, for example, with an amine sulfonate having a hydroxy group or with a vinyl polymer having a hydroxy group and a nonionic hydrophilic group. These polyisocyanates may be used alone or in combination with one another.

<Polyalkylene Glycol Alkyl Ether>

The polyalkylene glycol alkyl ether used in the present embodiment has a structure represented by the following general formula (1).

(1)

(In the formula (1), $R_1$ is an alkylene group having 1 to 4 carbon atoms and $R_2$ is an alkyl group having 1 to 4 carbon atoms. The average of n is 5.0 or more and 20 or less.)

The polyalkylene glycol alkyl ether does not consist of a single component but is an ensemble of components which differ in the number n representing the degree of polymerization (the number n may be referred to as "degree of polymerization n" or simply referred to as "n" hereinafter). The degree of polymerization n is therefore expressed by an average value. The polyalkylene glycol alkyl ether which does not consist of a single component has a molecular weight distribution, and a polydispersity index is employed to express the molecular weight distribution. In the present embodiment, the polydispersity index of molecular weight distribution is determined as follows: A mass spectrum of the polyalkylene glycol alkyl ether is obtained through separation by liquid chromatography and subsequent measurement by mass spectrometry, and the polydispersity index is calculated from the expressions given below using molecular weights determined from mass-to-charge ratios (m/z) and relative ion intensities. This enables determination of the polydispersity index of molecular weight distribution of an analyte for which measurement by gel permeation chromatography (which hereinafter may be simply referred to as "GPC") is difficult (an example of such an analyte is a polyalkylene glycol alkyl ether in the polyisocyanate composition of the present embodiment). The "polyalkylene glycol alkyl ether" as described herein may be any of the following: a polyalkylene glycol alkyl ether used as a starting material for the polyisocyanate composition of the present embodiment; an unreacted polyalkylene glycol alkyl ether in the polyisocyanate composition; and a polyalkylene glycol alkyl ether-derived moiety of the modified polyisocyanate in the polyisocyanate composition.

Polydispersity index of molecular weight distribution=$B/A$ $A=\Sigma M_i I_i/\Sigma I_i$ $B=\Sigma M_i^2 I_i/\Sigma M_i I_i$ ($M_i$ represents the molecular weight of each component determined from a mass-to-charge ratio (m/z), and $I_i$ represents the relative ion intensity of each component.)

For a polyalkylene glycol alkyl ether having a single-peak molecular weight distribution centered at the average of degrees of polymerization n, the polydispersity index of molecular weight distribution is typically 1.00 or more and less than 1.05.

In the modified polyisocyanate of the present embodiment, the polydispersity index of molecular weight distribution of the polyalkylene glycol alkyl ether-derived moiety is 1.05 or more and 2.00 or less, preferably 1.06 or more and 1.50 or less, more preferably 1.08 or more and 1.45 or less, and even more preferably 1.10 or more and 1.40 or less, in terms of dispersion stability in water and coating appearance. It is presumed that when the polydispersity index of molecular weight distribution is 1.05 or more and 2.00 or less, a component that forms a thick hydration layer and keeps a certain distance between particles and a component that weakens interaction with water molecules coexist in appropriate proportions, which limits viscosity increase and leads to good coating appearance as well as stable dispersion of particles. In addition, when the polydispersity index of molecular weight distribution is 1.05 or more and 2.00 or less, both limited viscosity increase and high dispersion stability in water can be achieved even if the content of the polyalkylene glycol alkyl ether is low.

Examples of methods for controlling the polydispersity index of molecular weight distribution of the polyalkylene glycol alkyl ether-derived moiety in the modified polyisocyanate within the above range include: using a polyalkylene glycol alkyl ether for which the polydispersity index of molecular weight distribution is 1.05 or more and 2.00 or less; and adjusting the polydispersity index by combining two or more polyalkylene glycol alkyl ethers which differ in the average of n. The polydispersity index of molecular weight distribution is measured by the method described in Examples.

$R_1$ of the polyalkylene glycol alkyl ether is an alkylene group having 1 to 4 carbon atoms in terms of impartation of hydrophilicity. In terms of impartation of higher hydrophilicity, an ethylene group, which has two carbon atoms, is preferred. $R_2$ is an alkyl group having 1 to 4 carbon atoms in terms of impartation of hydrophilicity. In terms of impartation of higher hydrophilicity, a methyl group, which has one carbon atom, is preferred.

The average of n is 5.0 or more, preferably 5.2 or more, more preferably 5.4 or more, and even more preferably 6.0 or more, in terms of dispersibility in water, dispersion stability in water, and coating appearance.

When the average of n is 5.0 or more, there is an increase in emulsifying capacity and therefore an improvement in dispersibility, so that easy dispersion is possible. This provides better dispersion in a primary component, resulting in better coating appearance.

In terms of dispersibility in water and coating appearance, the average of n is 20 or less, preferably 15 or less, more preferably 14 or less, even more preferably 11 or less, and still even more preferably 9.4 or less.

When the average of n is 20 or less, an excessive viscosity increase resulting in gelation or the like can be prevented more reliably so that easy dispersion is possible. This provides better dispersion in a primary component, resulting in better coating appearance.

Examples of the polyalkylene glycol alkyl ether include, but are not limited to, polyethylene glycol (mono)methyl ether, poly(ethylene, propylene) glycol (mono)methyl ether, and polyethylene glycol (mono)ethyl ether. Polyethylene glycol (mono)methyl ether is preferred in terms of impartation of hydrophilicity.

The number of hydroxy groups of the polyalkylene glycol alkyl ether is preferably one in terms of reducing the viscosity of the polyisocyanate composition.

The polyalkylene glycol alkyl ether contains alkylene oxide repeating units represented by —$(R_iO)_n$—. The average of n in the polyalkylene glycol alkyl ether has only to be 5.0 or more and 20 or less, and the number of the alkylene oxide repeating units may vary within this range. The average number of the alkylene oxide repeating units (which hereinafter may be referred to as "average alkylene oxide repeating unit number"), i.e., the average of n, is 5.0 or more, preferably 5.2 or more, more preferably 5.4 or more, and even more preferably 6.0 or more, in terms of dispersibility in water, dispersion stability in water, and coating appearance.

When the average of n is 5.0 or more, there is an increase in emulsifying capacity and therefore an improvement in dispersibility, so that easy dispersion is possible. This provides better dispersion in a primary component, resulting in better coating appearance.

In terms of dispersibility in water and coating appearance, the average of n is 20 or less, preferably 15 or less, more preferably 14 or less, even more preferably 11 or less, and still even more preferably 9.4 or less.

When the average of n is 20 or less, an excessive viscosity increase resulting in gelation or the like can be prevented more reliably so that easy dispersion is possible. This provides better dispersion in a primary component, resulting in better coating appearance.

The average of degree of polymerizations n of the polyalkylene glycol alkyl ether in the polyisocyanate composition of the present embodiment refers to the average of degree of polymerizations n of the polyalkylene glycol alkyl ether-derived moiety of the modified polyisocyanate. The average of degree of polymerizations n is measured by the method described in Examples.

To adjust the above-described polydispersity index of molecular weight distribution of the polyalkylene glycol alkyl ether to 1.05 or more and 2.00 or less, two or more polyalkylene glycol alkyl ethers which differ in the average of n may be used in combination. An example of combination is to combine at least one first component selected from the group consisting of polyalkylene glycol alkyl ethers in which the average of n is 3.0 or more and 10 or less and at least one second component selected from the group consisting of polyalkylene glycol alkyl ethers in which the average of n is 6.0 or more and 22 or less. It should be noted that polyalkylene glycol alkyl ethers to be combined differ in the average of n.

The proportion of the polyalkylene glycol alkyl ether modified (the modification degree) in the polyisocyanate composition refers to the proportion of the polyalkylene glycol alkyl ether modified based on 100 equivalents of the isocyanate groups of the polyisocyanate which is a starting material. The modification degree is preferably 1.0% or more and 30% or less, more preferably 3.0% or more and 25% or less, and even more preferably 5.0% or more and 20% or less. When the modification degree is 1.0% or more, interlayer tension is reduced so that dispersibility in water is exhibited. When the modification degree is 30% or less, the amount of isocyanate groups to be involved in crosslinking is increased so that crosslinkability tends to be improved.

An exemplary method for controlling the modification degree within the above range is, but not limited to, adjustment of the mixing ratio between the polyalkylene glycol alkyl ether and the polyisocyanate. The modification degree is measured by the method described in Examples.

In terms of dispersibility in water and dispersion stability in water, the amount of the polyalkylene glycol alkyl ether-derived moiety of the modified polyisocyanate is 10 mass % or more, preferably 11 mass % or more, and more preferably 13 mass % or more based on the total amount (100 mass %) of the polyisocyanate composition. When the amount of the polyalkylene glycol alkyl ether-derived moiety of the modified polyisocyanate is 10 mass % or more, a hydration layer is formed so that dispersibility is improved.

In terms of retention of isocyanate groups and coating physical properties, the amount of the polyalkylene glycol alkyl ether-derived moiety is 18 mass % or less, preferably 17.5 mass % or less, and more preferably 17 mass % or less. When the amount of the polyalkylene glycol alkyl ether-derived moiety in the modified polyisocyanate is 18 mass % or less, the occurrence of contact between water and isocyanate groups is reduced so that the retention of isocyanate group is high and the coating physical properties (hardness, solvent resistance, and water resistance) are improved. The retention of isocyanate groups is measured by the method described in Examples.

An example of methods for reacting a polyisocyanate and the polyalkylene glycol alkyl ether is, but not limited to, a method in which terminal isocyanate groups of the polyisocyanate are reacted with hydroxy groups of the polyalkylene glycol alkyl ether.

The isocyanate group content of the polyisocyanate composition of the present embodiment, as determined when the non-volatile content is substantially 100 mass %, is preferably 10 mass % or more and 24 mass % or less, more preferably 11 mass % or more and 23 mass % or less, and even more preferably 12 mass % or more and 21 mass % or less. When the isocyanate group content is 10 mass % or more and 24 mass % or less, the amount of isocyanate groups to be involved in crosslinking is large, and the mobility of polyisocyanate molecules during curing is good. This provides enhanced crosslinkability, which tends to improve the coating physical properties. The isocyanate groups as described herein include both isocyanate groups of the unreacted polyisocyanate and isocyanate groups of the modified polyisocyanate.

An exemplary method for controlling the isocyanate group content within the above range is, but not limited to, adjustment of the mixing ratio between the polyalkylene glycol alkyl ether and the polyisocyanate. The isocyanate group content is measured by the method described in Examples.

In the polyisocyanate composition of the present embodiment, the number-average molecular weight of the polyisocyanate including the modified polyisocyanate and unreacted polyisocyanate is preferably 450 or more and 1200 or less, more preferably 500 or more and 1100 or less, and even more preferably 550 or more and 1000 or less, in terms of dispersion stability in water and dispersibility in a primary component. When the number-average molecular weight of the polyisocyanate is 450 or more and 1200 or less, the amount of a trimer component to be involved in crosslinking is large, and the mobility of polyisocyanate molecules during curing is good. This provides enhanced crosslinkability, which tends to improve the coating physical properties.

An exemplary method for controlling the number-average molecular weight within the above range is, but not limited to, adjustment of the mixing ratio between the polyalkylene glycol alkyl ether and the polyisocyanate. The number-average molecular weight of the polyisocyanate is measured by the method described in Examples.

The number, on average, of isocyanate functional groups (which hereinafter may be also referred to as "average number of isocyanate functional groups") of the polyisocyanate including the modified polyisocyanate and unreacted polyisocyanate according to the present embodiment is 1.8 or more, preferably 2.3 or more, and more preferably 2.5 or more in terms of coating crosslinkability.

When the average number of isocyanate functional groups is 1.8 or more, the mobility of polyisocyanate molecules during curing is good, so that the coating crosslinkability is enhanced.

In terms of the retention of isocyanate groups, the average number of isocyanate functional groups is 4.0 or less, preferably 3.6 or less, and more preferably 3.4 or less.

When the average number of isocyanate functional groups is 4.0 or less, the occurrence of contact between water and isocyanate groups is reduced so that the retention of isocyanate groups is increased.

An exemplary method for controlling the average number of isocyanate functional groups within the above range is, but not limited to, adjustment of the mixing ratio between the polyalkylene glycol alkyl ether and the polyisocyanate. The average number of isocyanate functional groups is measured by the method described in Examples.

The non-volatile content in the polyisocyanate composition corresponds to the ratio (%) of the mass of the composition after heating to the mass of the composition before heating, and is preferably 10% or more and 100% or less and more preferably 50% or more and 100% or less. When the non-volatile content is 10% or more, the polyisocyanate composition has a decreased viscosity and thus tends to be easy to handle. When the non-volatile content is 100% or less, the amount of an organic solvent to be used can be reduced so that environmental friendliness tends to be improved.

An exemplary method for controlling the non-volatile content within the above range is, but not limited to, adjustment of the mixing ratio between the polyisocyanate composition and a solvent. The non-volatile content is measured by the method described in Examples.

The dispersed particle size in water of the polyisocyanate composition of the present embodiment is preferably 30 nm or more, more preferably 40 nm or more, and even more preferably 50 nm or more, in terms of dispersion stability in water and coating appearance.

When the dispersed particle size in water is 30 nm or more, the polyisocyanate composition is likely to be present between particles formed by a resin contained in a primary component and is easily incorporated into the particles. This allows uniform crosslinking, which tends to improve the coating physical properties (appearance, hardness, solvent resistance, and water resistance).

In terms of dispersion stability in water and coating appearance, the dispersed particle size in water is preferably 200 nm or less, more preferably 190 nm or less, and even more preferably 180 nm or less.

When the dispersed particle size in water is 200 nm or less, the polyisocyanate composition is likely to be present between particles formed by a resin contained in a primary component and is easily incorporated into the particles. This allows uniform crosslinking, which tends to improve the coating physical properties (appearance, hardness, solvent resistance, and water resistance).

An exemplary method for controlling the dispersed particle size in water within the above range is, but not limited to, adjustment of the mixing ratio between the polyalkylene glycol alkyl ether and the polyisocyanate. The dispersed particle size in water is measured by the method described in Examples.

The polyisocyanate composition of the present embodiment may contain a component other than the modified polyisocyanate and unreacted polyisocyanate which have been described above. Examples of the other component include a solvent, an antioxidant, a light stabilizer, a polymerization inhibitor, and a surfactant.

It is preferable for the antioxidant to be a phenolic compound in terms of improving the coating appearance achieved with stirring at low intensity and in terms of preventing coating yellowing. Examples of the phenolic compound include, but are not necessarily limited to: hindered phenolic compounds such as 2,6-di-t-butylphenol, 2,4-dimethyl-6-t-butylphenol, 2,6-di-t-butyl-p-cresol (BHT), 2,6-di-t-butyl-4-ethylphenol, 2,4,6-tri-t-butylphenol, 2,6-di-t-butyl-4-s-butylphenol, 2,6-di-t-butyl-4-hydroxymethylphenol, n-octadecyl-β-(4'-hydroxy 3'5'-di-t-butylphenyl)propionate, 3,5-di-t-butyl-4-hydroxybenzylphosphonate-diethyl ester, 2,2'-methylenebis(4-methyl-6-t-butylphenol), 2,2'-methylenebis(4-ethyl-6-t-butylphenol), 4,4'-methylenebis(2,6-di-t-butylphenol), 2,2'-methylenebis(4-methyl-6-cyclohexylphenol), triethylene glycol-N-bis-3-(3-t-butyl-4-hydroxy-5-methylphenyl)propionate, 1,6-hexanediol bis[3-(3,5-di-t-butyl-4-hydroxyphenyl)propionate], 4,4'-di- or tri-thiobis(2,6-di-t-butylphenol), 2,2-thiodiethylenebis-[3(3,5-di-t-butyl-4-hydroxyphenyl) propionate], 2,4-bis(n-octylthio)-6-(4-hydroxy-3',5'-di-t-butylanilino)-1,3,5-triazine, N,N'-hexamethylenebis-(3,5-di-t-butyl-4-hydroxyhydrocinnamide, N,N'-bis[3-(3,5-di-t-butyl-4-hydroxyphenyl)propionyl]hydrazine, calcium (3,5-di-t-butyl-4-hydroxybenzyl monoethyl phosphonate), 1,3,5-trimethyl-2,4,6-tris(3,5-di-t-butyl-4-hydroxybenzyl) benzene, tris(3,5-di-t-butyl-4-hydroxyphenyl)isocyanurate, tris(3,5-di-t-butyl-4-hydroxybenzyl)isocyanurate, 1,3,5-tris [2[3-(3,5-di-t-butyl-4-hydroxyphenyl)propionyloxy]ethyl] isocyanate, and tetrakis[methylene-3-(3',5'-di-t-butyl-4-hydroxyphenyl)propionate]methane; butylhydroxyanisole (BHA); tocopherol; 2-t-butyl-4-(N,N-dimethylaminomethyl)phenol; propyl gallate; octyl gallate; lauryl gallate; 2,2'-dihydroxy-3,3'-di(α-methylcyclohexyl)-5,5'-dimethyl-diphenylmethane; 2,2'-dimethylene-bis-(6-α-methyl-benzyl-p-cresol); 2,2'-ethylidene-bis(4,6-di-t-butylphenol); 2,2'-buthylidene-bis(4-methyl-6-t-butylphenol); 4,4'-buthylidene-bis(3-methyl-6-t-butylphenol); bis[2-t-butyl-4-methyl-6-(3-t-butyl-5-methyl-2-hydroxybenzyl)phenyl] terephthalate; 3,9-bis[2-{3-(3-t-butyl-4-hydroxy-5-methylphenyl)propionyloxy}-1,1-dimethylethyl]-2,4,8,10-tetraoxaspiro[5,5]undecane; 4,4'-thiobis(6-t-butyl-m-cresol); 4,4'-thiobis(3-methyl-6-t-butylphenol); 2,2'-thiobis (4-methyl-6-t-butylphenol); bis(3,5-di-t-butyl-4-hydroxybenzyl)sulfide; alkylated bisphenol; 1,1,3-tris(2-methyl-4-hydroxy-5-t-butylphenyl)butane; 1,3,5-tris(4-t-butyl-3-hydroxy-2,6-dimethylbenzyl)isocyanurate; and 3,3-bis(3-t-butyl-4-hydroxyphenyl)ethylene butyrate.

Among the above, the hindered phenolic compounds are more preferred in terms of improving the coating appearance achieved with stirring at low intensity. Among the hindered phenolic compounds, at least one selected from the group consisting of 2,6-di-t-butylphenol, 2,6-di-t-butyl-p-cresol (BHT), 2,6-di-t-butyl-4-ethylphenol, 2,4,6-tri-t-butylphenol, and 2,6-di-t-butyl-4-s-butylphenol is even more preferably contained.

When the polyisocyanate composition contains a hindered phenolic compound, the content of the hindered phenolic compound is preferably 0.001 mass % or more and 0.1 mass % or less, more preferably 0.003 mass % or more and 0.08 mass % or less, and even more preferably 0.005 mass % or more and 0.05 mass % or less based on the total amount (100 mass %) of the polyisocyanate composition, in terms of further improving the coating appearance achieved with low-intensity stirring.

When the content of the hindered phenolic compound is 0.001 mass % or more, coating smoothness is improved so that the coating appearance achieved with low-intensity stirring tends to be further improved. When the content of the hindered phenolic compound is 0.1 mass % or less, bleed out during coating formation can be prevented, so that the coating appearance achieved with low-intensity stirring tends to be further improved. The content of the hindered phenolic compound is measured by the method described in Examples.

The content of the solvent is preferably 0 mass % or more and 90 mass % or less, more preferably 0 mass % or more and 50 mass % or less, and even more preferably 0 mass % or more and 30 mass % or less based on the total amount (100 mass %) of the polyisocyanate composition. The content of the antioxidant, light stabilizer, polymerization inhibitor, or surfactant is preferably 0 mass % or more and 10 mass % or less, more preferably 0 mass % or more and 5.0 mass % or less, and even more preferably 0 mass % or more and 2.0 mass % or less based on the total amount (100 mass %) of the polyisocyanate composition.

[Method for Producing Polyisocyanate Composition]

The method for producing a polyisocyanate composition according to the present embodiment includes a reaction step of reacting a polyisocyanate with a polyalkylene glycol alkyl ether represented by the general formula (2) below to obtain a polyisocyanate composition containing a modified polyisocyanate. The reaction step is performed to obtain the polyisocyanate composition in which an average number of isocyanate functional groups is 1.8 or more and 4.0 or less, a moiety derived from the polyalkylene glycol alkyl ether in the modified polyisocyanate is contained in an amount of 10 mass % or more and 18 mass % or less based on the total amount (100 mass %) of the polyisocyanate composition, and a polydispersity index of molecular weight distribution of the moiety derived from the polyalkylene glycol alkyl ether in the modified polyisocyanate is 1.05 or more and 2.00 or less. In the reaction step, the reaction is preferably accomplished by mixing the polyisocyanate and the polyalkylene glycol alkyl ether.

(2)

(In the formula (2), $R_1$ is an alkylene group having 1 to 4 carbon atoms and $R_2$ is an alkyl group having 1 to 4 carbon atoms. The average of n is 5.0 or more and 20 or less.)

The polydispersity index of molecular weight distribution of the polyalkylene glycol alkyl ether used in the reaction step is 1.05 or more and 2.00 or less, preferably 1.06 or more and 1.50 or less, more preferably 1.08 or more and 1.45 or less, and even more preferably 1.10 or more and 1.40 or less, in terms of dispersion stability in water and coating appearance.

It is presumed that when the polydispersity index of molecular weight distribution is 1.05 or more and 2.00 or less, a component that forms a thick hydration layer and keeps a certain distance between particles and a component that weakens interaction with water molecules coexist in appropriate proportions, which limits viscosity increase and leads to good coating appearance as well as stable dispersion of particles. In addition, when the polydispersity index of molecular weight distribution is 1.05 or more and 2.00 or less, both limited viscosity increase and high dispersion stability in water can be achieved even if the content of the polyalkylene glycol alkyl ether is low.

In the reaction step, $R_1$ of the polyalkylene glycol alkyl ether is an alkylene group having 1 to 4 carbon atoms in terms of impartation of hydrophilicity. In terms of impartation of higher hydrophilicity, an ethylene group, which has two carbon atoms, is preferred. $R_2$ is an alkyl group having 1 to 4 carbon atoms in terms of impartation of hydrophilicity. In terms of impartation of higher hydrophilicity, a methyl group, which has one carbon atom, is preferred.

Furthermore, the average of n is 5.0 or more, preferably 5.2 or more, more preferably 5.4 or more, and even more preferably 6.0 or more in terms of dispersibility in water, dispersion stability in water, and coating appearance.

When the average of n is 5.0 or more, there is an increase in emulsifying capacity and therefore an improvement in dispersibility, so that easy dispersion is possible. This provides better dispersion in a primary component, resulting in better coating appearance.

In terms of dispersibility in water and coating appearance, the average of n is 20 or less, preferably 15 or less, more preferably 14 or less, even more preferably 11 or less, and still even more preferably 9.4 or less.

When the average of n is 20 or less, an excessive viscosity increase resulting in gelation or the like can be prevented more reliably so that easy dispersion is possible. This provides better dispersion in a primary component, resulting in better coating appearance.

In the reaction step, a combination of two or more polyalkylene glycol alkyl ethers which differ in the average of n may be used as the polyalkylene glycol alkyl ether in order that the polydispersity index of molecular weight distribution of the polyalkylene glycol alkyl ether-derived moiety in the modified polyisocyanate is controlled to 1.05 or more and 2.00 or less. When two or more polyalkylene glycol alkyl ethers which differ in the average of n are used in combination, the two or more polyalkylene glycol alkyl ethers may be mixed first and the mixture may be mixed and reacted with the polyisocyanate. Alternatively, two or more polyalkylene glycol alkyl ethers which differ in the average of n may be simultaneously or sequentially mixed and reacted with the polyisocyanate.

An example of combination is to combine at least one first component selected from the group consisting of polyalkylene glycol alkyl ethers in which the average of n is 3.0 or more and 10 or less and at least one second component selected from the group consisting of polyalkylene glycol alkyl ethers in which the average of n is 6.0 or more and 22 or less, provided that the polyalkylene glycol alkyl ethers to be combined differ in the average of n.

In terms of dispersibility in water and dispersion stability in water, the polyalkylene glycol alkyl ether and the polyisocyanate are reacted in the reaction step in such proportions that the amount of the polyalkylene glycol alkyl ether-derived moiety in the modified polyisocyanate is 10 mass % or more, preferably 11 mass % or more, and more preferably 13 mass % or more. When the amount of the polyalkylene glycol alkyl ether-derived moiety in the modified polyisocyanate is 10 mass % or more, a hydration layer is formed so that dispersibility is improved.

In terms of the retention of isocyanate groups and the coating physical properties, the reaction is performed so that the amount of the polyalkylene glycol alkyl ether-derived moiety in the modified polyisocyanate is 18 mass % or less, preferably 17.5 mass % or less, and more preferably 17% or less. When the amount of the polyalkylene glycol alkyl ether-derived moiety in the modified polyisocyanate is 18 mass % or less, the occurrence of contact between water and isocyanate groups is reduced so that the retention of isocyanate groups is increased and the coating physical properties (hardness, solvent resistance, and water resistance) of the resulting coating are improved. The retention of isocyanate groups is measured by the method described in Examples.

The reaction temperature and reaction time in the reaction step can be varied depending on the progress of the reaction. The reaction temperature is preferably 0° C. or higher and 150° C. or lower, and the reaction time is preferably 0.5 hours or more and 48 hours or less.

In the reaction step, a known catalyst may be used if desired. Examples of the catalyst include, but are not limited to: organic tin compounds such as tin octanoate, tin 2-ethyl-1-hexanoate, tin ethylcaproate, tin laurate, tin palmitate, dibutyltin oxide, dibutyltin dichloride, dibutyltin diacetate, dibutyltin dimaleate, dibutyltin dilaurate, dioctyltin diacetate, and dioctyltin dilaurate; organic zinc compounds such as zinc chloride, zinc octanoate, zinc 2-ethyl-1-hexanoate, zinc 2-ethylcaproate, zinc stearate, zinc naphthenate, and zinc acetylacetonate; organic titanium compounds; organic zirconium compounds; tertiary amines such as triethylamine, tributylamine, N,N-diisopropylethylamine, and N,N-dimethylethanolamine; and diamines such as triethylenediamine, tetramethylethylenediamine, and 1,4-diazabicyclo [2.2.2]octane. These may be used alone or as a mixture of two or more thereof.

In the method for producing a polyisocyanate composition according to the present embodiment, a solvent may or may not be used. The solvent used in the method for producing a polyisocyanate composition according to the present embodiment may be a hydrophilic solvent or a hydrophobic solvent.

Examples of the hydrophobic solvent include, but are not limited to: mineral spirit; solvent naphtha; low aromatic white spirit (LAWS); high aromatic white spirit (HAWS); toluene; xylene; cyclohexane; esters such as ethyl acetate and butyl acetate; and ketones such as acetone, methyl ethyl ketone, methyl isobutyl ketone, and cyclohexanone.

Examples of the hydrophilic solvent include, but are not limited to: alcohols such as methanol, ethanol, propanol, isopropanol, and 2-ethylhexanol; ethers such as diethylene glycol dimethyl ether, diethylene glycol diethyl ether, diethylene glycol dibutyl ether, and dipropylene glycol dimethyl ether; and esters of ether alcohols such as ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, propylene glycol monomethyl ether acetate, propylene glycol monomethyl ether acetate, and dipropylene glycol monomethyl ether acetate. These may be used alone or as a mixture of two or more thereof.

In the method for producing a polyisocyanate composition according to the present embodiment, at least one selected from the group consisting of an antioxidant, a light stabilizer, a polymerization inhibitor, and a surfactant may be added in addition to the polyalkylene glycol alkyl ether and the polyisocyanate.

[Coating Composition and Aqueous Coating Composition]

A coating composition according to the present embodiment comprises the polyisocyanate composition described above. An aqueous coating composition according to the present embodiment comprises the coating composition and water. The coating composition is not particularly limited as long as it comprises the polyisocyanate composition described above. The coating composition may be an organic solvent-based coating composition other than an aqueous coating composition containing water. An aqueous coating composition, which contains a water-based medium in which a resin as a coating-forming component is dissolved or dispersed, is more preferred than a coating composition containing no water in terms of reduction in the amount of an organic solvent to be used.

The coating composition and aqueous coating composition are usable, for example, in paints for buildings, paints for automobiles, paints for automobile repair, paints for plastics, viscous adhesives, adhesives, building materials, household aqueous paints, coating agents, sealing agents, inks, casting materials, elastomers, foams, plastic materials, and fiber treating agents.

Examples of the resin used as a primary component in the aqueous coating composition include, but are not limited to, acrylic resins, polyester resins, polyether resins, epoxy resins, fluorine resins, polyurethane resins, polyvinylidene chloride copolymers, polyvinyl chloride copolymers, vinyl acetate copolymers, acrylonitrile-butadiene copolymers, polybutadiene copolymers, and styrene-butadiene copolymers.

Examples of the acrylic resins include, but are not limited to, acrylic resins obtained by polymerization of one or a mixture of monomers selected from: (meth)acrylic acid esters such as methyl (meth)acrylate, ethyl (meth)acrylate, isopropyl (meth)acrylate, n-butyl (meth)acrylate, 2-ethylhexyl (meth)acrylate, and lauryl (meth)acrylate; (meth) acrylic acid esters having active hydrogen such as 2-hydroxyethyl (meth)acrylate, 2-hydroxypropyl (meth)acrylate, 2-hydroxybutyl (meth)acrylate, 3-hydroxypropyl (meth) acrylate, and 4-hydroxybutyl (meth)acrylate; unsaturated carboxylic acids such as acrylic acid, methacrylic acid, maleic acid, and itaconic acid; unsaturated amides such as acrylamide, N-methylol acrylamide, and diacetone acrylamide; and other polymerizable monomers such as glycidyl methacrylate, styrene, vinyltoluene, vinyl acetate, acrylonitrile, dibutyl fumarate, p-styrenesulfonic acid, and allylsulfosuccinic acid. The method for polymerization is typically emulsion polymerization. The acrylic resins can be produced also by suspension polymerization, dispersion polymerization, or solution polymerization. In emulsion polymerization, the polymerization may be carried out in a stepwise fashion.

Examples of the polyester resins include, but are not limited to, polyester resins obtained by a condensation reaction of one or a mixture of carboxylic acids selected from the group consisting of succinic acid, adipic acid, sebacic acid, dimer acid, maleic anhydride, phthalic anhydride, isophthalic acid, terephthalic acid, trimellitic acid, and pyromellitic acid with one or a mixture of polyhydric alcohols selected from the group consisting of: diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol, and 2,2-diethyl-1,3-propanediol; triols such as glycerin and trimethylolpropane; and tetraols such as diglycerin, dimethylolpropane, and pentaerythritol. Other examples include polycaprolactones as obtained by ring-opening polymerization of ε-caprolactone with hydroxy groups of a low-molecular weight polyol.

Examples of the polyether resins include, but are not limited to: polyether polyols obtained by addition reacting one or a mixture of alkylene oxides such as ethylene oxide, propylene oxide, butylene oxide, cyclohexene oxide, and styrene oxide with one or a mixture of polyhydroxy compounds by means of a hydroxide of lithium, sodium potassium or the like, or a strongly basic catalyst such as an alcoholate or alkylamine; polyether polyols obtained by a reaction of a polyfunctional compound such as an ethylenediamine with an alkylene oxide; polyether polyols obtained by ring-opening polymerization of a cyclic ether such as tetrahydrofuran; and so-called polymer polyols obtained by polymerization of acrylamide etc. by mediation of the polyethers mentioned above.

Among the above-mentioned resins, acrylic resins and polyester resins are preferred. A resin material such as a melamine curing agent, urethane dispersion, or urethane acrylic emulsion can be additionally used if desired.

The above resins are preferably emulsifiable, dispersible, or soluble in water. To this end, carboxyl groups, sulfone groups, etc. contained in the resins can be neutralized.

An exemplary neutralizer usable for neutralization of carboxyl groups, sulfone groups, etc. is, but not limited to, at least one selected from ammonia and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, and morpholine. Preferred as the neutralizer are triethylamine and dimethylethanolamine which are tertiary amines.

Furthermore, there may be incorporated an additive which is commonly added to a paint, such as an inorganic pigment, organic pigment, extender pigment, silane coupling agent, titanium coupling agent, organic phosphoric acid salt, organic phosphorous acid salt, thickener, leveling agent, thixotropy imparting agent, anti-foaming agent, anti-freezing agent, delusterant, crosslinking catalyst, anti-sticking agent, dispersant, wetting agent, filler, plasticizer, lubricant, reductant, preservative, anti-fungal agent, deodorant, anti-yellowing agent, ultraviolet absorber, anti-static agent, electrostatic modifier, or anti-setting agent. To improve dispersibility in the paint, a surfactant may be further added. To improve the storage stability of the paint, an antioxidant, light stabilizer, and polymerization inhibitor may be further added.

[Coated Substrate]

A coated substrate according to the present embodiment is a coated substrate including a substrate and a coating film coating the substrate, the coating film being formed from the above coating composition or the above aqueous coating composition.

Examples of the substrate used in the present embodiment include, but are not limited to, metals, wood, glass, stones, ceramics, concretes, rigid or flexible plastics, fiber products, leather products, and paper. In some cases, a common primer may be provided on the substrate before coating.

EXAMPLES

Hereinafter, the present embodiment will be described in more detail with reference to specific examples and comparative examples. The present embodiment is by no means limited by the examples and comparative examples given below within the gist of the present embodiment. The physical properties of polyisocyanate compositions according to the examples and comparative examples were measured as described below. Unless otherwise specified, "part(s)" and "%" respectively refer to "part(s) by mass" and "mass %".

(Physical Property 1) Isocyanate Group Content

Each polyisocyanate composition was used as a specimen, and the isocyanate group content was measured according to the method specified in JIS K 7301-1995 (Testing methods for tolylene diisocyanate type preporlymers for thermosetting urethane elastomers). The method for measuring the isocyanate group content will be more specifically described below.

(1) The specimen weighing 1 g was placed in a 200 mL conical flask, and 20 mL of toluene was added into the flask to dissolve the specimen.

(2) After that, 20 mL of a 2.0 N di-n-butylamine-toluene solution was added into the flask, which was left in place for 15 minutes.

(3) 70 mL of 2-propanol was added into the flask and dissolved to obtain a solution.

(4) The solution obtained in (3) was titrated with 1 mol/L hydrochloric acid to determine the titer of the specimen solution.

(5) The measurement was carried out by the same procedures as in (1) to (3) for the case where no specimen was added, and the titer of the blank solution was determined.

The isocyanate group content was calculated by the following calculation equation from the titer of the specimen solution and the titer of the blank solution determined as above.

Isocyanate group content (mass %)=(Titer of blank solution−titer of specimen solution)×42/[mass of specimen (g)×1,000]×100%

(Physical Property 2) Number-Average Molecular Weight of Polyisocyanate

Each polyisocyanate composition was used as a specimen, and the number-average molecular weight of the polyisocyanate including the modified polyisocyanate and unreacted polyisocyanate in the polyisocyanate composition was determined as a polystyrene-equivalent number-average molecular weight measured by gel permeation chromatography (GPC) using the apparatus and conditions listed below.

Apparatus: HLC-8120 GPC (trade name), manufactured by Tosoh Corporation

Column: TSKgel Super H1000 (trade name)×1, TSKgel Super H2000 (trade name)×1, TSKgel Super H3000 (trade name)×1, manufactured by Tosoh Corporation Carrier: Tetrahydrofuran Detection means: Differential refractometer (Physical Property 3) Average Number of Isocyanate Functional Groups Each polyisocyanate composition was used as a specimen, and the average number of isocyanate functional groups, which is the statistically determined number of isocyanate functional groups per polyisocyanate molecule, was calculated as follows from the number-average molecular weight of the polyisocyanate measured in (Physical property 2) and the isocyanate group content measured in (Physical property 1).

Average number of functional groups=Number-average molecular weight of the polyisocyanate× isocyanate group content (mass %)/100%/42

(Physical Property 4) Non-Volatile Content

Each polyisocyanate composition was used as a specimen. When dilution with a solvent was done, an aluminum cup was accurately weighed, about 1 g of the specimen was placed in the cup, and then the cup was accurately weighed before drying by heating. The cup containing the specimen was heated in a dryer at 105° C. for 3 hours. The heated cup was cooled to room temperature, and then the cup was accurately weighed again. The mass % of the dry residue of the specimen was determined as the non-volatile content. The calculation equation for the non-volatile content is given below. When dilution with a solvent was not done, the non-volatile content was assumed to be substantially 100%.

Non-volatile content (mass %)=(Mass of cup after drying by heating−mass of aluminum cup)/ (mass of cup before drying by heating−mass of aluminum cup)×100%

(Physical Property 5) Dispersed Particle Size in Water of Polyisocyanate

Each polyisocyanate composition was used as a specimen. The dispersed particle size in water of the polyisocyanate including the modified polyisocyanate and unreacted polyisocyanate in the polyisocyanate composition was measured as the value of 50% diameter (d50) in a cumulative distribution curve obtained by a laser diffraction-scattering particle size distribution analyzer.

Analyzer: Microtrac Nanotrac UPA-EX150 manufactured by NIKKISO CO., LTD.

Transmissivity of particles: Transmissive
Shape of particles: Non-spherical
Refractive index of particles: 1.81
Refractive index of solvent: 1.33
Analysis range: From 0.95 nm to 6540 nm
Sample measurement time: 120 seconds
Background measurement time: 120 seconds (Physical Property 6) Average of n of Polyalkylene Glycol Alkyl Ether in Polyisocyanate Composition Each polyisocyanate composition was used as a specimen, and the average of n was determined by proton nuclear magnetic resonance (NMR) using the apparatus and conditions listed below. The integrated value of the relative intensity attributed to the alkylene group and the integrated value of the relative intensity attributed to the alkyl group were correlated to determine the average of n of the polyalkylene glycol alkyl ether in the polyisocyanate composition.

NMR apparatus: Bruker Biospin Avance 600 (trade name)
Observed nucleus: $^1$H
Frequency: 600 MHz
Solvent: $CDCl_3$
Cumulative number: 256 times (Physical Property 7) Average of n of Polyalkylene Glycol Alkyl Ether as Starting Material Each polyalkylene glycol alkyl ether prepared as a starting material was used as a specimen, and the average of n was calculated from a hydroxyl value described below.

The hydroxyl value measurement was carried out according to the methods specified in JIS K 0070-1992 (Test methods for acid value, saponification value, ester value, iodine value, hydroxyl value and unsaponifiable matter of chemical products) and JIS K 1557-1 (Plastics-Polyols for use in the production of polyurethane-Part 1: Determination of hydroxyl number).

The molecular weight of the polyalkylene glycol alkyl ether was determined from the hydroxyl value determined as above, and the average of n was calculated from the molecular weight using the following calculation equation.

Average of $n$=(Molecular weight of polyalkylene glycol alkyl ether−molecular weight of alkyl group−molecular weight of hydroxy group)/ (molecular weight of alkylene oxide)

Molecular weight of polyalkylene glycol alkyl ether=56.1×1000/[hydroxyl value (mgKOH/g)]

For example, when the polyalkylene glycol alkyl ether used was polyethylene glycol (mono)methyl ether, the average of n was determined as follows.

Average of $n$=(Molecular weight of polyethylene glycol (mono)methyl ether−molecular weight of methyl group (15)−molecular weight of hydroxy group (17))/(molecular weight of ethylene oxide (44))

(Physical Property 8) Amount of Modification of Polyalkylene Glycol Alkyl Ether (Modification Degree)

Each polyisocyanate composition was used as a specimen, and the modification degree, which is the amount of modification of the polyalkylene glycol alkyl ether based on 100 equivalents of the isocyanate groups of the polyisocyanate used as a starting material, was determined from the peak area ratios of an unmodified isocyanurate trimer, a mono-modified isocyanurate trimer, a double-modified isocyanurate trimer, and a triple-modified isocyanurate trimer at 220 nm in liquid chromatography (LC). The apparatus and conditions used were as follows.

LC apparatus: UPLC (trade name), manufactured by Waters Corporation

Column: ACQUITY UPLC HSS T3 1.8 µm C18, manufactured by Waters Corporation and having an inner diameter of 2.1 mm and a length of 50 mm Flow rate: 0.3 mL/min Mobile phase: A=10 mM aqueous ammonium acetate solution, B=acetonitrile Gradient conditions: The initial composition of the mobile phase was set to A/B=98/2, the proportion of B was linearly increased after injection of the specimen, and A/B=0/100 was reached after 10 minutes.

Detection means: Photodiode array detector, measurement wavelength=220 nm (Physical Property 9) Content of Polyalkylene Glycol Alkyl Ether-Derived Moiety Each polyisocyanate composition was used as a specimen, and the content of the polyalkylene glycol alkyl ether-derived moiety of the modified polyisocyanate in the polyisocyanate composition was calculated as follows from the isocyanate group content measured in (Physical property 1), the molecular weight of the polyalkylene glycol alkyl ether calculated from the average of n of the polyalkylene glycol alkyl ether determined in (Physical property 6), and the modification degree determined in (Physical property 8).

Content (%)=Isocyanate group content (mass %)/100%/42/(100−modification degree (%)×modification degree (%)×molecular weight of polyalkylene glycol alkyl ether×100%

For example, when the polyalkylene glycol alkyl ether used was polyethylene glycol (mono)methyl ether, its molecular weight was determined as follows.

Molecular weight of polyethylene glycol (mono) methyl ether=molecular weight of methyl group (15)+molecular weight of hydroxy group (17)+ (molecular weight of ethylene oxide (44)×average of $n$)

(Physical Property 10) Polydispersity Index of Molecular Weight Distribution of Polyalkylene Glycol Alkyl Ether Each polyalkylene glycol alkyl ether prepared as a starting material was used as a specimen, and a polydispersity index (1) of molecular weight distribution of the polyalkylene glycol alkyl ether was determined. In addition, each polyisocyanate composition was used as a specimen, and a polydispersity index (2) of molecular weight distribution of the unreacted polyalkylene glycol alkyl ether was determined. A polydispersity index (3) of molecular weight distribution of the polyalkylene glycol alkyl ether-derived moiety of the modified polyisocyanate in the polyisocyanate composition was assumed to be equal to the polydispersity index (2) of molecular weight distribution.

When each polyalkylene glycol alkyl ether prepared as a starting material was used as a specimen, the reactivity of the polyalkylene glycol alkyl ether was constant regardless of the molecular weight. Thus, as indicated in Table 1, the polydispersity index (1) of molecular weight distribution of the polyalkylene glycol alkyl ether initially introduced as a starting material was equal to the polydispersity index (2) of the molecular weight distribution of the unreacted polyalkylene glycol alkyl ether detected in the polyisocyanate composition. It was therefore determined that the polydispersity index (3) of molecular weight distribution of the polyalkylene glycol alkyl ether-derived moiety of the modified polyisocyanate obtained by a reaction with a polyisocyanate was determined to be the same as the polydispersity index of molecular weight distribution indices (1) and (2). In Table 1, the difference between the polydispersity indices (1) and (2) of molecular weight distribution is within the range of measurement error.

The apparatus and conditions used were as follows.

LC apparatus: UPLC (trade name), manufactured by Waters Corporation

Column: ACQUITY UPLC HSS T3 1.8 µm C18, manufactured by Waters Corporation and having an inner diameter of 2.1 mm and a length of 50 mm Flow rate: 0.3 mL/min Mobile phase: a=10 mM aqueous ammonium acetate solution, b=acetonitrile Gradient conditions: The initial composition ratio of the mobile phase was set to a/b=98/2, the proportion of b was linearly increased after injection of the specimen, and a/b=0/100 was reached after 10 minutes.

Detection means 1: Photodiode array detector, measurement wavelength=220 nm

Detection means 2: Synapt G2 (trade name), a mass spectrometer manufactured by Waters Corporation Ionization mode: Electrospraying ionization, positive ion detection Scan range: from 100 to 2000 m/z Measurement was conducted using the apparatus and conditions shown above. After separation of components by liquid chromatography, the polydispersity index of molecular weight distribution was determined based on the polyalkylene glycol alkyl ether-derived ion detected in mass spectrometry. Specifically, the polydispersity index of molecular weight distribution was calculated by the following equations using molecular weights determined from mass-to-charge ratios (m/z) and relative ion intensities.

Polydispersity index of molecular weight distribution=$B/A$ $A=\Sigma M_i I_i / \Sigma I_i$ $B=\Sigma M_i^2 I_i / \Sigma M_i I_i$ ($M_i$ represents the molecular weight of each component determined from a mass-to-charge ratio (m/z), and $I_i$ represents the relative ion intensity of each component.)

(Physical Property 11) Content of Hindered Phenolic Compound

Each polyisocyanate composition was used as a specimen, and the content of a hindered phenolic compound in the polyisocyanate composition was calculated from the peak area of the hindered phenolic compound detected at an ultraviolet (UV) wavelength of 280 nm in gel permeation chromatography (GPC) performed using the apparatus and conditions shown below.

Apparatus: HLC-8120 GPC (trade name), manufactured by Tosoh Corporation

Column: TSKgel Super H1000 (trade name)×1, TSKgel Super H2000 (trade name)×1, and TSKgel Super H3000 (trade name)×1, manufactured by Tosoh Corporation Carrier: Tetrahydrofuran Detection means: Differential UV spectrometer Calculation method: A polyisocyanate having a known content of a hindered phenolic compound was subjected to measurement to create a calibration curve based on the area (mV×seconds) attributed to the hindered phenolic compound. Then, the hindered phenolic compound content was determined from an area (mV×seconds) detected from each of the polyisocyanate compositions according to examples and comparative examples.

[Production Example 1] Polyisocyanate Composition (1)

The interior of a four-necked flask equipped with a stirrer, a thermometer, a reflux condenser tube, a nitrogen inlet tube, and a dropping funnel was purged with nitrogen. In the flask were placed 1000 parts of HDI and 30 parts of 2-ethylhexanol, and urethanization was allowed to proceed under stirring at 80° C. for 2 hours. Tetramethylammonium capriate was added as a catalyst for isocyanuratization and allophanatization in an amount of 0.04 parts to allow a reaction to proceed for about 3 hours, after which 0.075 parts of an aqueous phosphoric acid solution having a solids content of 85% was added to stop the reaction. The reaction solution was filtered, and then the unreacted HDI was removed using a thin-film evaporator. A polyisocyanate composition (1) was thus obtained.

[Production Example 2] Polyisocyanate Composition (2)

A nitrogen atmosphere was created in a four-necked flask equipped with a stirrer, a thermometer, a reflux condenser tube, a nitrogen inlet tube, and a dropping funnel. In the flask were placed 600 parts of HDI and 30 parts of polycaprolactone-based polyester polyol which was a trihydric alcohol having a molecular weight of 300 (manufactured by Daicel Corporation under the trade name "Placcel 303"), and urethanization was allowed to proceed under stirring with the reactor temperature maintained at 90° C. for 1 hour. After that, tetramethylammonium capriate was added as a catalyst for isocyanuratization with the reactor temperature maintained at 60° C. At the time when a yield of 48% was reached, phosphoric acid was added to stop the reaction. The reaction solution was filtered, and then the unreacted HDI was removed using a thin-film evaporator. A polyisocyanate composition (2) was thus obtained.

[Production Example 3] Polyethylene Glycol Monomethyl Ether (1)

The interior of a reactor of a 1000 mL autoclave was purged with nitrogen, and 128 g (4.0 mol) of methanol and 0.56 g (10.0 mmol) of potassium hydroxide were placed in the reactor. After a temperature increase to 110° C., 880 g (28.0 mol) of ethylene oxide was allowed to undergo a reaction under pressure for 2.5 hours with the temperature maintained at 110° C., and this was followed by aging for 1 hour. An amount of 1.16 g (10.0 mmol) of 85 mass % phosphoric acid was added to the resulting reaction mixture for neutralization, and then a precipitated potassium salt of phosphoric acid was removed by filtration. A polyethylene glycol monomethyl ether (1) with an average of 7.0 ethylene oxide repeating units was thus obtained. Its polydispersity index was measured to be 1.03.

[Production Example 4] Polyethylene Glycol Monomethyl Ether (2)

The interior of a reactor of a 1000 mL autoclave was purged with nitrogen, and 128 g (4.0 mol) of methanol and 0.56 g (10.0 mmol) of potassium hydroxide were placed in the reactor. After a temperature increase to 110° C., 1056 g (24.0 mol) of ethylene oxide was allowed to undergo a reaction under pressure for 2.5 hours with the temperature maintained at 110° C., and this was followed by aging for 1 hour. An amount of 1.16 g (10.0 mmol) of 85 mass % phosphoric acid was added to the resulting reaction mixture for neutralization, and then a precipitated potassium salt of phosphoric acid was removed by filtration. A polyethylene glycol monomethyl ether (2) with an average of 6.0 ethylene oxide repeating units was thus obtained. Its polydispersity index was measured to be 1.04.

[Preparation Example 1] Polyethylene Glycol Monomethyl Ether (3)

Triethylene glycol monomethyl ether with an average of 3.0 ethylene oxide repeating units and polyethylene glycol monomethyl ether with an average of 9.0 ethylene oxide repeating units (manufactured by NIPPON NYUKAZAI CO., LTD. under the trade name "MPG-130") were mixed at a mass ratio of 2.1:10.9 to obtain a polyethylene glycol monomethyl ether (3) with an average of 7.0 ethylene oxide repeating units. Its polydispersity index was determined to be 1.06.

[Preparation Example 2] Polyethylene Glycol Monomethyl Ether (4)

Polyethylene glycol monomethyl ether with an average of 4.2 ethylene oxide repeating units (manufactured by NIPPON NYUKAZAI CO., LTD. under the trade name "MPG") and polyethylene glycol monomethyl ether with an average of 9.0 ethylene oxide repeating units (manufactured by NIPPON NYUKAZAI CO., LTD. under the trade name "MPG-130") were mixed at a mass ratio of 130:55 to obtain a polyethylene glycol monomethyl ether (4) with an average of 5.0 ethylene oxide repeating units. Its polydispersity index was measured to be 1.13.

[Preparation Example 5] Polyethylene Glycol Monomethyl Ether (7)

Polyethylene glycol monomethyl ether with an average of 9.0 ethylene oxide repeating units (manufactured by NIPPON NYUKAZAI CO., LTD. under the trade name "MPG-130") and polyethylene glycol monomethyl ether with an average molecular weight of 1000 (manufactured by NOF CORPORATION under the trade name "UNIOX M-1000" (with an average of 22 ethylene oxide repeating units)) were mixed at a mass ratio of 5.7:11.3 to obtain a polyethylene glycol monomethyl ether (5) with an average of 15.0 ethylene oxide repeating units. Its polydispersity index was measured to be 1.20.

[Preparation Example 4] Polyethylene Glycol Monomethyl Ether (6)

Polyethylene glycol monomethyl ether with an average of 4.2 ethylene oxide repeating units (manufactured by NIPPON NYUKAZAI CO., LTD. under the trade name "MPG") and polyethylene glycol monomethyl ether with an average of 9.0 ethylene oxide repeating units (manufactured by NIPPON NYUKAZAI CO., LTD. under the trade name "MPG-130") were mixed at a mass ratio of 16:19 to obtain a polyethylene glycol monomethyl ether (6) with an average of 6.0 ethylene oxide repeating units. Its polydispersity index was measured to be 1.11.

[Preparation Example 5] Polyethylene Glycol Monomethyl Ether (7)

The polyethylene glycol monomethyl ether (2) with an average of 6.0 ethylene oxide repeating units, which was obtained in Production Example 4, and polyethylene glycol monomethyl ether with an average molecular weight of 550 (manufactured by NOF CORPORATION under the trade name "UNIOX M-550" (with an average of 11.8 ethylene oxide repeating units)) were mixed at a mass ratio of 1:2 to obtain a polyethylene glycol monomethyl ether (7) with an average of 9.0 ethylene oxide repeating units. Its polydispersity index was measured to be 1.10.

[Preparation Example (6)] Polyethylene Glycol Monomethyl Ether (8)

Polyethylene glycol monomethyl ether with an average of 9.0 ethylene oxide repeating units (manufactured by NIPPON NYUKAZAI CO., LTD. under the trade name "MPG-130") and polyethylene glycol monomethyl ether with an average of 15.0 ethylene oxide repeating units (manufactured by NIPPON NYUKAZAI CO., LTD. under the trade name "MPG-081") were mixed at a mass ratio of 6.8:11.0 to obtain a polyethylene glycol monomethyl ether (8) with an average of 12.0 ethylene oxide repeating units. Its polydispersity index was measured to be 1.12.

[Preparation Example 7] Polyethylene Glycol Monomethyl Ether (9)

Polyethylene glycol monomethyl ether with an average of 4.2 ethylene oxide repeating units (manufactured by NIPPON NYUKAZAI CO., LTD. under the trade name "MPG") and polyethylene glycol monomethyl ether with an average of 9.0 ethylene oxide repeating units (manufactured by NIPPON NYUKAZAI CO., LTD. under the trade name "MPG-130") were mixed at a mass ratio of 12.5:3.5 to obtain a polyethylene glycol monomethyl ether (9) with an average of 4.8 ethylene oxide repeating units. Its polydispersity index was measured to be 1.17.

[Preparation Example 8] Polyethylene Glycol Monomethyl Ether (10)

An amount of 200 mass ppm of 2,6-di-t-butyl-p-cresol (BHT) was added to the polyethylene glycol monomethyl ether (6) obtained in Preparation Example 4, and they were mixed by stirring at 40° C. for 2 hours to obtain a polyethylene glycol monomethyl ether (10).

[Preparation Example 9] Polyethylene Glycol Monomethyl Ether (11)

An amount of 400 mass ppm of 2,6-di-t-butyl-p-cresol (BHT) was added to the polyethylene glycol monomethyl ether (6) obtained in Preparation Example 4, and they were mixed by stirring at 40° C. for 2 hours to obtain a polyethylene glycol monomethyl ether (11).

[Preparation Example 10] Polyisocyanate Composition (3)

An amount of 500 mass ppm of 2,6-di-t-butyl-p-cresol (BHT) was added to a commercially-available polyisocyanate composition (manufactured by Asahi Kasei Chemicals Corporation under the trade name "TPA-100"), and they were mixed by stirring at 40° C. for 2 hours to obtain a polyisocyanate composition (3).

[Preparation Example 11] Polyethylene Glycol Monomethyl Ether (12)

Polyethylene glycol monomethyl ether with an average of 4.2 ethylene oxide repeating units (manufactured by NIPPON NYUKAZAI CO., LTD. under the trade name "MPG") and polyethylene glycol monomethyl ether with an average of 9.0 ethylene oxide repeating units (manufactured by NIPPON NYUKAZAI CO., LTD. under the trade name "MPG-130") were mixed at a mass ratio of 46:27 to obtain a polyethylene glycol monomethyl ether (12) with an average of 5.3 ethylene oxide repeating units. Its polydispersity index was measured to be 1.13.

[Preparation Example 12] Polyethylene Glycol Monomethyl Ether (13)

Polyethylene glycol monomethyl ether with an average of 4.2 ethylene oxide repeating units (manufactured by NIPPON NYUKAZAI CO., LTD. under the trade name "MPG") and polyethylene glycol monomethyl ether with an average of 9.0 ethylene oxide repeating units (manufactured by NIPPON NYUKAZAI CO., LTD. under the trade name "MPG-130") were mixed at a mass ratio of 30:22 to obtain a polyethylene glycol monomethyl ether (13) with an average of 5.5 ethylene oxide repeating units. Its polydispersity index was measured to be 1.12.

Example 1

The polyethylene glycol monomethyl ether (3) with an average of 7.0 ethylene oxide repeating units, which was obtained in Preparation Example 1, was added in an amount of 13 parts by mass to 87 parts by mass of a commercially-available polyisocyanate composition (manufactured by Asahi Kasei Chemicals Corporation under the trade name "TKA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 180 nm, the isocyanate group content was 17.3 mass %, the number-average molecular weight was 760, and the average number of isocyanate functional groups was 3.1. The average number of ethylene oxide repeating units detected by NMR was 7.1, and the polydispersity index of the polyethylene glycol monomethyl ether in the obtained composition was determined to be 1.06. The modification degree in the obtained composition was 8.4%, and the content of the polyethylene glycol monomethyl ether was thus calculated to be 13.0%.

Example 2

The polyethylene glycol monomethyl ether (4) with an average of 5.0 ethylene oxide repeating units, which was obtained in Preparation Example 2, was added in an amount of 16 parts by mass to 84 parts by mass of a commercially-available polyisocyanate composition (manufactured by Asahi Kasei Chemicals Corporation under the trade name "TPA-100"), and they were stirred under nitrogen at 90° C.

for 8 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 190 nm, the isocyanate group content was 16.5 mass %, the number-average molecular weight was 700, and the average number of isocyanate functional groups was 2.8. The average number of ethylene oxide repeating units detected by NMR was 5.0, and the polydispersity index of the polyethylene glycol monomethyl ether in the obtained composition was determined to be 1.14. The modification degree in the obtained composition was 14.0%, and the content of the polyethylene glycol monomethyl ether was thus calculated to be 16.1%.

Example 3

The polyethylene glycol monomethyl ether (5) with an average of 15 ethylene oxide repeating units, which was obtained in Preparation Example 3, was added in an amount of 17 parts by mass to 83 parts by mass of a commercially-available polyisocyanate composition (manufactured by Asahi Kasei Chemicals Corporation under the trade name "24A-100"), and they were stirred under nitrogen at 90° C. for 6 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 80 nm, the isocyanate group content was 18.6 mass %, the number-average molecular weight was 720, and the average number of isocyanate functional groups was 3.2. The average number of ethylene oxide repeating units detected by NMR was 15.0, and the polydispersity index of the polyethylene glycol monomethyl ether in the obtained composition was determined to be 1.21. The modification degree in the obtained composition was 5.2%, and the content of the polyethylene glycol monomethyl ether was thus calculated to be 16.8%.

Example 4

The polyethylene glycol monomethyl ether (6) with an average of 6.0 ethylene oxide repeating units, which was obtained in Preparation Example 4, was added in an amount of 17 parts by mass to 83 parts by mass of the polyisocyanate composition (1) obtained in Production Example 1, and they were stirred under nitrogen at 110° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 50 nm, the isocyanate group content was 14.8 mass %, the number-average molecular weight was 670, and the average number of isocyanate functional groups was 2.4. The average number of ethylene oxide repeating units detected by NMR was 6.1, and the polydispersity index of the polyethylene glycol monomethyl ether in the obtained composition was determined to be 1.11. The modification degree in the obtained composition was 13.9%, and the content of the polyethylene glycol monomethyl ether was thus calculated to be 17.1%.

Example 5

1,3-butanediol (referred to as "1,3-BD" in the table) was added in an amount of 3 parts by mass to 84 parts by mass of a commercially-available polyisocyanate composition (manufactured by Asahi Kasei Chemicals Corporation under the trade name "TKA-100"), and they were stirred under nitrogen at 80° C. for 2 hours to allow a reaction to proceed. After that, the polyethylene glycol monomethyl ether (7) with an average of 9.0 ethylene oxide repeating units, which was obtained in Preparation Example 5, was added in an amount of 13 parts by mass, and this was followed by stirring under nitrogen at 120° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 100 nm, the isocyanate group content was 14.0 mass %, the number-average molecular weight was 1070, and the average number of isocyanate functional groups was 3.6. The average number of ethylene oxide repeating units detected by NMR was 9.0, and the polydispersity index of the polyethylene glycol monomethyl ether in the obtained composition was determined to be 1.10. The modification degree in the obtained composition was 8.4%, and the content of the polyethylene glycol monomethyl ether was thus calculated to be 13.1%.

Example 6

The polyethylene glycol monomethyl ether (7) with an average of 9.0 ethylene oxide repeating units, which was obtained in Preparation Example 5, was added in an amount of 10 parts by mass to 90 parts by mass of the polyisocyanate composition (1) obtained in Production Example 1, and they were stirred under nitrogen at 110° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 160 nm, the isocyanate group content was 17.6 mass %, the number-average molecular weight was 620, and the average number of isocyanate functional groups was 2.6. The average number of ethylene oxide repeating units detected by NMR was 9.1, and the polydispersity index of the polyethylene glycol monomethyl ether in the obtained composition was determined to be 1.11. The modification degree in the obtained composition was 5.3%, and the content of the polyethylene glycol monomethyl ether was thus calculated to be 10.0%.

Example 7

The polyethylene glycol monomethyl ether (8) with an average of 12.0 ethylene oxide repeating units, which was obtained in Preparation Example 6, and propylene glycol monomethyl ether acetate were added in amounts of 17.8 parts by mass and 40 parts by mass, respectively, to a mixture of 24.7 parts by mass of a commercially-available HDI-based polyisocyanate composition (manufactured by Asahi Kasei Chemicals Corporation under the trade name "TKA-100") and 57.5 parts by mass of a commercially-available IPDI-based polyisocyanate composition (manufactured by Evonik Japan under the trade name "T1890/100", and they were stirred under nitrogen at 100° C. for 6 hours to allow a reaction to proceed. As a result of the reaction, a modified polyisocyanate-containing polyisocyanate composition was obtained.

For the obtained polyisocyanate composition, the non-volatile content was 72.0%, the dispersed particle size in water was 50 nm, the isocyanate group content as calculated by assuming a non-volatile content of 100% (as calculated by determining an isocyanate group content in the presence of the solvent and dividing the determined value by the non-volatile content ratio) was 13.5 mass %, the number-average molecular weight was 880, and the average number of isocyanate functional groups was 2.8. The average number of ethylene oxide repeating units detected by NMR was 12.0. The polydispersity index of the polyethylene glycol monomethyl ether in the obtained composition was determined to be 1.12. The modification degree in the obtained composition was 9.0%, and the content of the polyethylene glycol monomethyl ether was thus calculated to be 17.8%.

Example 8

The polyethylene glycol monomethyl ether (4) with an average of 5.0 ethylene oxide repeating units, which was obtained in Preparation Example 2, was added in an amount of 17.2 parts by mass to a mixture of 26.5 parts by mass of a commercially-available polyisocyanate composition (manufactured by Asahi Kasei Chemicals Corporation under the trade name "TPA-100"), 43.0 parts by mass of the polyisocyanate composition (1) obtained in Production Example 1, and 10.0 parts by mass of polypropylene glycol with a number-average molecular weight of 6400 (manufactured by ASAHI GLASS CO., LTD. under the trade name "EXCENOL 840", which is referred to as "Ex 840" in the table), and they were stirred under nitrogen at 120° C. for 6 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 80 nm, the isocyanate group content was 12.3 mass %, the number-average molecular weight was 820, and the average number of isocyanate functional groups was 2.4. The average number of ethylene oxide repeating units detected by NMR was 5.0, and the polydispersity index of the polyethylene glycol monomethyl ether in the obtained composition was determined to be 1.13. The modification degree in the obtained composition was 19.5%, and the content of the polyethylene glycol monomethyl ether was thus calculated to be 17.9%.

Example 9

The polyethylene glycol monomethyl ether (7) with an average of 9.0 ethylene oxide repeating units, which was obtained in Preparation Example 5, and butyl acetate were added in amounts of 15.0 parts by mass and 40 parts by mass, respectively, to a mixture of 59.5 parts by mass of a commercially-available HDI-based polyisocyanate composition (manufactured by Asahi Kasei Chemicals Corporation under the trade name "TKA-100") and 25.5 parts by mass of a commercially-available IPDI-based polyisocyanate composition (manufactured by Evonik Japan under the trade name "T1890/100"), and they were stirred under nitrogen at 100° C. for 6 hours to allow a reaction to proceed. As a result of the reaction, a modified polyisocyanate-containing polyisocyanate composition was obtained.

For the obtained polyisocyanate composition, the non-volatile content was 72.5%, the dispersed particle size in water was 80 nm, the isocyanate group content as calculated by assuming a non-volatile content of 100% (as calculated by determining an isocyanate group content in the presence of the solvent and dividing the determined value by the non-volatile content ratio) was 15.5 mass %, the number-average molecular weight was 810, and the average number of isocyanate functional groups was 3.0. The average number of ethylene oxide repeating units detected by NMR was 9.0, and the polydispersity index of the polyethylene glycol monomethyl ether in the obtained composition was determined to be 1.09. The modification degree in the obtained composition was 8.7%, and the content of the polyethylene glycol monomethyl ether was thus calculated to be 15.1%.

Example 10

The polyethylene glycol monomethyl ether (6) with an average of 6.0 ethylene oxide repeating units, which was obtained in Preparation Example 4, was added in an amount of 16.0 parts by mass to 84 parts by mass of a commercially-available polyisocyanate composition (manufactured by Asahi Kasei Chemicals Corporation under the trade name "TPA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 140 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.11. The modification degree in the obtained composition was 11.8%, and the content of the polyethylene glycol monomethyl ether was thus calculated to be 15.9%.

Example 11

A modified polyisocyanate-containing polyisocyanate composition was obtained by the same procedure as in Example 10, except for using the polyethylene glycol monomethyl ether (10) obtained in Preparation Example 8 instead of the polyethylene glycol monomethyl ether (6) obtained in Preparation Example 4.

For the obtained polyisocyanate composition, the non-volatile content was 100%, the dispersed particle size in water was 140 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.11. The modification degree in the obtained composition was 11.8%, and the content of the polyethylene glycol monomethyl ether was thus calculated to be 15.9%. The BHT content was 0.003%.

Example 12

A modified polyisocyanate-containing polyisocyanate composition was obtained by the same procedure as in Example 10, except for using the polyethylene glycol monomethyl ether (11) obtained in Preparation Example 9 instead of the polyethylene glycol monomethyl ether (6) obtained in Preparation Example 4.

For the obtained polyisocyanate composition, the nonvolatile content was 100%, the dispersed particle size in water was 140 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.11. The modification degree in the obtained composition was 11.8%, and the content of the polyethylene glycol monomethyl ether was thus calculated to be 15.9%. The BHT content was 0.006%.

Example 13

A modified polyisocyanate-containing polyisocyanate composition was obtained by the same procedures as in Example 10, except for using the polyisocyanate composition (3) obtained in Production Example 10 instead of the commercially-available polyisocyanate composition (manufactured by Asahi Kasei Chemicals Corporation under the trade name "TPA-100").

For the obtained polyisocyanate composition, the nonvolatile content was 100%, the dispersed particle size in water was 140 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.11. The modification degree in the obtained composition was 11.8%, and the content of the polyethylene glycol monomethyl ether was thus calculated to be 15.9%. The BHT content was 0.04%.

Example 14

The polyethylene glycol monomethyl ether (6) with an average of 6.0 ethylene oxide repeating units, which was obtained in Preparation Example 4, and BHT were added in amounts of 16.0 parts by mass and 0.1 parts by mass, respectively, to 84 parts by mass of a commercially-available polyisocyanate composition (manufactured by Asahi Kasei Chemicals Corporation under the trade name "TPA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the nonvolatile content was 100%, the dispersed particle size in water was 140 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.11. The modification degree in the obtained composition was 11.8%, and the content of the polyethylene glycol monomethyl ether was thus calculated to be 15.9%. The BHT content was 0.10%.

Example 15

The polyethylene glycol monomethyl ether (12) with an average of 5.3 ethylene oxide repeating units, which was obtained in Preparation Example 11, was added in an amount of 17.5 parts by mass to 82.5 parts by mass of a commercially-available polyisocyanate composition (manufactured by Asahi Kasei Chemicals Corporation under the trade name "TPA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the nonvolatile content was 100%, the dispersed particle size in water was 150 nm, the isocyanate group content was 16.2 mass %, the number-average molecular weight was 700, and the average number of isocyanate functional groups was 2.7. The average number of ethylene oxide repeating units detected by NMR was 5.2, and the polydispersity index of the polyethylene glycol monomethyl ether in the obtained composition was determined to be 1.13. The modification degree in the obtained composition was 14.7%, and the content of the polyethylene glycol monomethyl ether was thus calculated to be 17.3%.

Example 16

The polyethylene glycol monomethyl ether (13) with an average of 5.5 ethylene oxide repeating units, which was obtained in Preparation Example 12, was added in an amount of 17.0 parts by mass to 83.0 parts by mass of a commercially-available polyisocyanate composition (manufactured by Asahi Kasei Chemicals Corporation under the trade name "TPA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the nonvolatile content was 100%, the dispersed particle size in water was 150 nm, the isocyanate group content was 16.4 mass %, the number-average molecular weight was 700, and the average number of isocyanate functional groups was 2.7. The average number of ethylene oxide repeating units detected by NMR was 5.4, and the polydispersity index of the polyethylene glycol monomethyl ether in the obtained composition was determined to be 1.12. The modification degree in the obtained composition was 13.8%, and the content of the polyethylene glycol monomethyl ether was thus calculated to be 16.9%.

Comparative Example 1

The polyethylene glycol monomethyl ether (1) with an average of 7.0 ethylene oxide repeating units, which was obtained in Production Example 3, was added in an amount of 13.0 parts by mass to 87 parts by mass of a commercially-available polyisocyanate composition (manufactured by Asahi Kasei Chemicals Corporation under the trade name "TKA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the nonvolatile content was 100%, the dispersed particle size in water was 240 nm, the isocyanate group content was 17.4 mass %, the number-average molecular weight was 760, and the average number of isocyanate functional groups was 3.1. The average number of ethylene oxide repeating units detected by NMR was 7.0, and the polydispersity index of the polyethylene glycol monomethyl ether in the obtained composition was determined to be 1.03. The modification degree in the obtained composition was 8.4%, and the content of the polyethylene glycol monomethyl ether was thus calculated to be 12.9%.

Comparative Example 2

Polyethylene glycol monomethyl ether with an average of 9.0 ethylene oxide repeating units (manufactured by NIPPON NYUKAZAI CO., LTD. under the trade name "MPG-130", polydispersity index of molecular weight distribution: 1.04) and butyl acetate were added in amounts of 15.0 parts by mass and 40 parts by mass, respectively, to a mixture of 59.5 parts by mass of a commercially-available HDI-based polyisocyanate composition (manufactured by Asahi Kasei Chemicals Corporation under the trade name "TKA-100") and 25.5 parts by mass of a commercially-available IPDI-based polyisocyanate composition (manufactured by Evonik Japan under the trade name "T1890/100"), and they were stirred under nitrogen at 100° C. for 6 hours to allow a reaction to proceed. As a result of the reaction, a modified polyisocyanate-containing polyisocyanate composition was obtained.

For the obtained polyisocyanate composition, the non-volatile content was 72.0%, the dispersed particle size in water was 200 nm, the isocyanate group content as calculated by assuming a non-volatile content of 100% (as calculated by determining an isocyanate group content in the presence of the solvent and dividing the determined value by the non-volatile content ratio) was 15.6 mass %, the number-average molecular weight was 800, and the average number of isocyanate functional groups was 3.0. The average number of ethylene oxide repeating units detected by NMR was 9.0, and the polydispersity index of the polyethylene glycol monomethyl ether in the obtained composition was determined to be 1.04. The modification degree in the obtained composition was 8.6%, and the content of the polyethylene glycol monomethyl ether was thus calculated to be 15.0%.

Comparative Example 3

The polyethylene glycol monomethyl ether (2) with an average of 6.0 ethylene oxide repeating units, which was obtained in Production Example 4, was added in an amount of 16.0 parts by mass to 84 parts by mass of a commercially-available polyisocyanate composition (manufactured by Asahi Kasei Chemicals Corporation under the trade name "TPA-100"), and they were stirred under nitrogen at 120° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 210 nm, the isocyanate group content was 16.9 mass %, the number-average molecular weight was 700, and the average number of isocyanate functional groups was 2.8. The average number of ethylene oxide repeating units detected by NMR was 6.0, and the polydispersity index of the polyethylene glycol monomethyl ether in the obtained composition was determined to be 1.04. The modification degree in the obtained composition was 12.0%, and the content of the polyethylene glycol monomethyl ether was thus calculated to be 16.2%.

Comparative Example 4

The polyethylene glycol monomethyl ether (9) with an average of 4.8 ethylene oxide repeating units, which was obtained in Preparation Example 7, was added in an amount of 16.0 parts by mass to 84 parts by mass of a commercially-available polyisocyanate composition (manufactured by Asahi Kasei Chemicals Corporation under the trade name "TPA-100"), and they were stirred under nitrogen at 90° C. for 8 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 250 nm, the isocyanate group content was 16.3 mass %, the number-average molecular weight was 700, and the average number of isocyanate functional groups was 2.7. The average number of ethylene oxide repeating units detected by NMR was 4.8, and the polydispersity index of the polyethylene glycol monomethyl ether in the obtained composition was determined to be 1.16. The modification degree in the obtained composition was 14.6%, and the content of the polyethylene glycol monomethyl ether was thus calculated to be 16.1%.

Comparative Example 5

The polyethylene glycol monomethyl ether (7) with an average of 9.0 ethylene oxide repeating units, which was obtained in Preparation Example 5, and butyl acetate were added in amounts of 15 parts by mass and 40 parts by mass, respectively, to 85 parts by mass of the polyisocyanate composition (2) obtained in Production Example 2, and they were stirred under nitrogen at 120° C. for 4 hours to allow a reaction to proceed. As a result of the reaction, a modified polyisocyanate-containing polyisocyanate composition was obtained.

For the obtained polyisocyanate composition, the non-volatile content was 72.5%, the dispersed particle size in water was 500 nm or more, the isocyanate group content as calculated by assuming a non-volatile content of 100% (as calculated by determining an isocyanate group content in the presence of the solvent and dividing the determined value by the non-volatile content ratio) was 14.5 mass %, the number-average molecular weight was 1300, and the average isocyanate functional group number was 4.5. The average number of ethylene oxide repeating units detected by NMR was 8.9, and the polydispersity index of the polyethylene glycol monomethyl ether in the obtained composition was determined to be 1.10. The modification degree in the obtained composition was 9.2%, and the content of the polyethylene glycol monomethyl ether was thus calculated to be 14.8%.

Comparative Example 6

The polyethylene glycol monomethyl ether (7) with an average of 9.0 ethylene oxide repeating units, which was obtained in Preparation Example 5, was added in an amount of 9 parts by mass to 91 parts by mass of the polyisocyanate composition (1) obtained in Production Example 1, and they were stirred under nitrogen at 110° C. for 3 hours to allow a reaction to proceed. As a result of the reaction, a modified polyisocyanate-containing polyisocyanate composition was obtained.

For the obtained polyisocyanate composition, the non-volatile content was 100%, the dispersed particle size in water was 210 nm, the isocyanate group content was 18.0 mass %, the number-average molecular weight was 620, and the average number of isocyanate functional groups was 2.7. The average number of ethylene oxide repeating units detected by NMR was 9.0, and the polydispersity index of the polyethylene glycol monomethyl ether in the obtained composition was determined to be 1.11. The modification degree in the obtained composition was 4.6%, and the content of the polyethylene glycol monomethyl ether was thus calculated to be 8.8%.

Comparative Example 7

Polyethylene glycol monomethyl ether with an average of 4.2 ethylene oxide repeating units (manufactured by NIP- PON NYUKAZAI CO., LTD. under the trade name "MPG", polydispersity index of molecular weight distribution: 1.01) and butyl acetate were added in amounts of 9 parts by mass and 40 parts by mass, respectively, to 91 parts by mass of the polyisocyanate composition (2) obtained in Production Example 2, and they were stirred under nitrogen at 120° C. for 4 hours to allow a reaction to proceed. As a result of the reaction, a modified polyisocyanate-containing polyisocyanate composition was obtained.

For the obtained polyisocyanate composition, the non-volatile content was 72.1%, the dispersed particle size in water was 500 nm or more, the isocyanate group content as calculated by assuming a non-volatile content of 100% (as calculated by determining an isocyanate group content in the presence of the solvent and dividing the determined value by the non-volatile content ratio) was 15.6 mass %, the number-average molecular weight was 1210, and the average number of isocyanate functional groups was 4.5. The average number of ethylene oxide repeating units detected by NMR was 4.2, and the polydispersity index of the polyethylene glycol monomethyl ether in the obtained composition was determined to be 1.01. The modification degree in the obtained composition was 10.0%, and the content of the polyethylene glycol monomethyl ether was thus calculated to be 8.9%.

The modified polyisocyanate-containing polyisocyanate compositions obtained in Examples 1 to 16 and Comparative Examples 1 to 7 were evaluated as described below. The evaluation results are shown in Table 1.

(Evaluation 1) Dispersibility in Water (1) A 100 mL flask and a sheet of Yoshino paper were weighed.

(2) The modified polyisocyanate-containing polyisocyanate composition was sampled into the 100 mL flask in an amount of 16 g in terms of solids content, and 24 g of deionized water was added.

(3) The solution in the 100 mL flask was stirred at 200 rpm for 3 minutes using a propeller blade, and then filtered through the Yoshino paper weighed in (1).

(4) The filtration residue on the Yoshino paper and the residue in the 100 mL flask were heated together in a dryer at 105° C. for 1 hour, and the total mass (g) of the residues was determined.

(5) The proportion of the water-dispersed portion of the modified polyisocyanate-containing composition was determined by the following calculation equation.

Proportion of water-dispersed portion (mass %)=100%−(total mass (g) determined in (4) of 100 mL flask and Yoshino paper including residue)−total mass (g) measured in (1) of 100 mL flask and Yoshino paper)/(mass (g) of modified polyisocyanate-containing polyisocyanate composition sampled in (2)×non-volatile content (mass %))×100%

The rating criteria were as follows.
A: 80 mass % or more
B: 60 mass % or more and less than 80 mass %
C: Less than 60 mass %

(Evaluation 2) Dispersion Stability in Water

An amount of 0.1 g of the modified polyisocyanate-containing polyisocyanate composition and 100 g of deionized water were weighed into a 200 mL flask, and the resulting solution in the 200 mL flask was stirred using a propeller blade at 600 rpm for 5 minutes to obtain an aqueous dispersion. The dispersion was then transferred into a 50 mL glass bottle, and the state of dispersion was observed with the naked eye. The rating criteria were as follows.
A: No change was observed after 3 hours.
B: Slight precipitation or separation was observed after 3 hours.
C: Precipitation or separation was observed in 3 hours.

(Evaluation 3) Retention of Isocyanate Groups

An amount of 15 g of the modified polyisocyanate-containing polyisocyanate composition and 45 g of deionized water were weighed into a 100 mL flask, and the resulting solution in the 100 mL flask was stirred using a propeller blade at 600 rpm for 10 minutes to obtain an aqueous dispersion. The retention of isocyanate groups in this aqueous dispersion was evaluated by the following procedure.

Infrared absorption spectroscopy (detector: TGS, cumulative number: 16 times, resolution: 4 cm$^{-1}$) was conducted using FT/IR-4200 type A (trade name) manufactured by JASCO Corporation, and the change in concentration of isocyanate groups was calculated from the ratio of the intensity of the absorption peak of isocyanate (around a wavenumber of 2271 cm$^{-1}$) to the intensity of the absorption peak of isocyanurate (around a wavenumber of 1686 cm$^{-1}$).

The time point when the aqueous dispersion was prepared was defined as 0 hours, the ratio of the intensity of the absorption peak of isocyanate to the intensity of the absorption peak of isocyanurate at 0 hours was defined as $X_0$, the peak intensity ratio at n hours was determined as $X_n$, and the retention of isocyanate groups was calculated as $X_n/X_0$. Evaluation was made based on the retention calculated at 4 hours. The rating criteria were as follows.
A: 80% or more
C: Less than 80%

TABLE 1

| | | Polyalkylene glycol monoalkyl ether used | | | Polyalkylene glycol monoalkyl ether in polyisocyanate composition | | | |
|---|---|---|---|---|---|---|---|---|
| Polyisocyanate Composition | Polyisocyanate and secondary material used | Type | (Physical property 7) Average of degree of polymerization n | (Physical property 10) Polydispersity index of molecular weight distribution | (Physical property 6) Average of degree of polymerization n | (Physical property 8) Modification degree (%) | (Physical property 9) Content (mass %) | (Physical property 10) Polydispersity index of molecular weight distribution |
| Example 1 | TKA-100 | Preparation Example 1 | 7.0 | 1.06 | 7.1 | 8.4 | 13.0 | 1.06 |
| Example 2 | TPA-100 | Preparation Example 2 | 5.0 | 1.13 | 5.0 | 14.0 | 16.1 | 1.14 |
| Example 3 | 24A-100 | Preparation Example 3 | 15.0 | 1.20 | 15.0 | 5.2 | 16.8 | 1.21 |

TABLE 1-continued

| Example | Polyisocyanate and secondary material used | Preparation | | | | | | |
|---|---|---|---|---|---|---|---|---|
| Example 4 | Production Example 1 | Preparation Example 4 | 6.0 | 1.11 | 6.1 | 13.9 | 17.1 | 1.11 |
| Example 5 | TKA-100 1,3-BD | Preparation Example 5 | 9.0 | 1.10 | 9.0 | 8.4 | 13.1 | 1.10 |
| Example 6 | Production Example 1 | Preparation Example 5 | 9.0 | 1.10 | 9.1 | 5.3 | 10.0 | 1.11 |
| Example 7 | TKA-100 T1890/100 | Preparation Example 6 | 12.0 | 1.12 | 12.0 | 9.0 | 17.8 | 1.12 |
| Example 8 | TPA-100 Production Example 1 Ex840 | Preparation Example 2 | 5.0 | 1.13 | 5.0 | 19.5 | 17.9 | 1.13 |
| Example 9 | TKA-100 T1890/100 | Preparation Example 5 | 9.0 | 1.10 | 9.0 | 8.7 | 15.1 | 1.09 |
| Example 10 | TPA-100 | Preparation Example 4 | 6.0 | 1.11 | 6.0 | 11.8 | 15.9 | 1.11 |
| Example 11 | TPA-100 | Preparation Example 8 | 6.0 | 1.11 | 6.0 | 11.8 | 15.9 | 1.11 |
| Example 12 | TPA-100 | Preparation Example 9 | 6.0 | 1.11 | 6.0 | 11.8 | 15.9 | 1.11 |
| Example 13 | Preparation Example 10 | Preparation Example 4 | 6.0 | 1.11 | 6.0 | 11.8 | 15.9 | 1.11 |
| Example 14 | TPA-100 | Preparation Example 4 | 6.0 | 1.11 | 6.0 | 11.8 | 15.9 | 1.11 |
| Example 15 | TPA-100 | Preparation Example 11 | 5.3 | 1.13 | 5.2 | 14.7 | 17.3 | 1.13 |
| Example 16 | TPA-100 | Preparation Example 12 | 5.5 | 1.12 | 5.4 | 13.8 | 16.9 | 1.12 |
| Comparative Example 1 | TKA-100 | Production Example 3 | 7.0 | 1.03 | 7.0 | 8.4 | 12.9 | 1.03 |
| Comparative Example 2 | TKA-100 T1890/100 | MPG-130 | 9.0 | 1.04 | 8.6 | 15.0 | 1.04 | |
| Comparative Example 3 | TPA-100 | Production Example 4 | 6.0 | 1.04 | 6.0 | 12.0 | 16.2 | 1.04 |
| Comparative Example 4 | TPA-100 | Preparation Example 7 | 4.8 | 1.17 | 4.8 | 14.6 | 16.1 | 1.16 |
| Comparative Example 5 | Production Example 2 | Preparation Example 5 | 9.0 | 1.10 | 8.9 | 9.2 | 14.8 | 1.10 |
| Comparative Example 6 | Production Example 1 | Preparation Example 5 | 9.0 | 1.10 | 9.0 | 4.6 | 8.8 | 1.11 |
| Comparative Example 7 | Production Example 2 | MPG | 4.2 | 1.01 | 4.2 | 10.0 | 8.9 | 1.01 |

| Polyisocyanate Composition | Polyisocyanate and secondary material used | Physical properties of polyisocyanate composition | | | | |
|---|---|---|---|---|---|---|
| | | (Physical property 1) Isocyanate group content (mass %) | (Physical property 2) Number-average molecular weight | (Physical property 3) Average number of isocyanate functional groups | (Physical property 4) Non-volatile content (%) | (Physical property 5) Dispersed particle size in water (nm) |
| Example 1 | TKA-100 | 17.3 | 760 | 3.1 | 100 | 180 |
| Example 2 | TPA-100 | 16.5 | 700 | 2.8 | 100 | 190 |
| Example 3 | 24A-100 | 18.6 | 720 | 3.2 | 100 | 80 |
| Example 4 | Production Example 1 | 14.8 | 670 | 2.4 | 100 | 50 |
| Example 5 | TKA-100 1,3-BD | 14.0 | 1070 | 3.6 | 100 | 100 |
| Example 6 | Production Example 1 | 17.6 | 620 | 2.6 | 100 | 160 |
| Example 7 | TKA-100 T1890/100 | 13.5 | 880 | 2.8 | 72.0 | 50 |
| Example 8 | TPA-100 Production Example 1 Ex840 | 12.3 | 820 | 2.4 | 100 | 80 |
| Example 9 | TKA-100 T1890/100 | 15.5 | 810 | 3.0 | 72.5 | 80 |
| Example 10 | TPA-100 | 16.9 | 700 | 2.8 | 100 | 140 |
| Example 11 | TPA-100 | 16.9 | 700 | 2.8 | 100 | 140 |
| Example 12 | TPA-100 | 16.9 | 700 | 2.8 | 100 | 140 |
| Example 13 | Preparation Example 10 | 16.9 | 700 | 2.8 | 100 | 140 |
| Example 14 | TPA-100 | 16.9 | 700 | 2.8 | 100 | 140 |
| Example 15 | TPA-100 | 16.2 | 700 | 2.7 | 100 | 150 |
| Example 16 | TPA-100 | 16.4 | 700 | 2.7 | 100 | 150 |
| Comparative Example 1 | TKA-100 | 17.4 | 760 | 3.1 | 100 | 240 |

TABLE 1-continued

| | | | | | | |
|---|---|---|---|---|---|---|
| Comparative Example 2 | TKA-100 T1890/100 | 15.6 | 800 | 3.0 | 72.0 | 200 |
| Comparative Example 3 | TPA-100 | 16.9 | 700 | 2.8 | 100 | 210 |
| Comparative Example 4 | TPA-100 | 16.3 | 700 | 2.7 | 100 | 250 |
| Comparative Example 5 | Production Example 2 | 14.5 | 1300 | 4.5 | 72.5 | 500 or more |
| Comparative Example 6 | Production Example 1 | 18.0 | 620 | 2.7 | 100 | 210 |
| Comparative Example 7 | Production Example 2 | 15.6 | 1210 | 4.5 | 72.1 | 500 or more |

| Polyisocyanate Composition | Polyisocyanate and secondary material used | Physical properties of polyisocyanate composition (Physical property 11) Content of hindered phenolic compound (mass %) | (Evaluation 1) Dispersibility in water | (Evaluation 2) Dispersion stability in water | (Evaluation 3) Retention of isocyanate groups |
|---|---|---|---|---|---|
| Example 1 | TKA-100 | 0 | A | B | A |
| Example 2 | TPA-100 | 0 | A | B | A |
| Example 3 | 24A-100 | 0 | B | A | A |
| Example 4 | Production Example 1 | 0 | A | A | A |
| Example 5 | TKA-100 1,3-BD | 0 | A | A | A |
| Example 6 | Production Example 1 | 0 | A | B | A |
| Example 7 | TKA-100 T1890/100 | 0 | B | A | A |
| Example 8 | TPA-100 Production Example 1 Ex840 | 0 | A | B | A |
| Example 9 | TKA-100 T1890/100 | 0 | A | A | A |
| Example 10 | TPA-100 | 0 | A | A | A |
| Example 11 | TPA-100 | 0.003 | A | A | A |
| Example 12 | TPA-100 | 0.006 | A | A | A |
| Example 13 | Preparation Example 10 | 0.04 | A | A | A |
| Example 14 | TPA-100 | 0.1 | A | A | A |
| Example 15 | TPA-100 | 0 | A | A | A |
| Example 16 | TPA-100 | 0 | A | A | A |
| Comparative Example 1 | TKA-100 | 0 | A | C | A |
| Comparative Example 2 | TKA-100 T1890/100 | 0 | A | C | A |
| Comparative Example 3 | TPA-100 | 0 | A | C | A |
| Comparative Example 4 | TPA-100 | 0 | A | C | A |
| Comparative Example 5 | Production Example 2 | 0 | A | C | C |
| Comparative Example 6 | Production Example 1 | 0 | A | C | A |
| Comparative Example 7 | Production Example 2 | 0 | A | C | A |

[Production Example 6] Production of Aqueous Emulsion

A four-necked separable flask equipped with a stirrer, a thermometer, a reflux condenser tube, a nitrogen inlet tube, and a dropping funnel was used as a reactor. In the flask were placed 675 g of water and 4.3 g of Emanol NC (an anion surfactant in the form of an 35% aqueous solution, manufactured by Kao Corporation), which were heated to 80° C. Ammonium persulfate (2% aqueous solution) was added as an initiator in an amount of 8 g. Next, a mixture of the following materials was added dropwise into the flask over 4 hours, and a temperature of 80° C. was maintained for 1 hour after completion of the dropwise addition.

| | |
|---|---|
| 2-hydroxymethyl methacrylate | 25 g (3.5 mass %) |
| Acrylic acid | 10 g (1.4 mass %) |
| Acrylamide | 2 g (0.3 mass %) |
| Glycidyl methacrylate | 27 g (3.8 mass %) |
| Methyl methacrylate | 353 g (49.0 mass %) |
| Butyl acrylate | 293 g (40.7 mass %) |
| Styrene | 9 g (1.3 mass %) |
| Water | 400 g |

-continued

| | |
|---|---|
| Ammonium persulfate (2% aqueous solution) | 31 g |
| ELEMINOL JS-2 (Note 1) | 38 g |
| EMULGEN 920 (Note 2) | 9 g |

(Note 1) Reactive emulsifier in the form of a 39% aqueous solution, manufactured by Sanyo Chemical Industries, Ltd.
(Note 2) Non-ionic surfactant in the form of a 25% aqueous solution, manufactured by Kao Corporation The resulting aqueous emulsion was a milky, stable dispersion having a non-volatile content of 38% and containing particles with a size of 100 nm. The hydroxyl value was calculated to be 15.0 mgKOH/g, the acid value was calculated to be 10.8 mgKOH/g, and the glass-transition temperature was calculated to be 15.7° C.

Examples 17 to 32 and Comparative Examples 8 to 14

Coating compositions (1) and (2) were prepared as described below using the modified polyisocyanate-containing polyisocyanate compositions obtained in Examples 1 to 16 and Comparative Examples 1 to 7. The prepared coating compositions (1) were used in (Evaluation 4) described below, while the coating compositions (2) were used in (Evaluation 5) to (Evaluation 8) described below.

[Preparation of Coating Composition (1)]

An amount of 40 g of the aqueous polyol dispersion prepared in Production Example 6 was weighed into a container, and a mixture was obtained by adding the modified polyisocyanate-containing polyisocyanate composition to the aqueous polyol dispersion so that NCO/OH ratio, the molar ratio of isocyanate groups in the modified polyisocyanate-containing polyisocyanate composition to hydroxyl groups in the aqueous polyol dispersion, would be 1.25. Deionized water was added to the mixture to allow the resulting coating composition to have a solids content of 38 mass %, and the resulting mixture was stirred using a propeller blade at 200 rpm for 3 minutes to prepare a coating composition. Coating evaluation was conducted using the prepared coating composition according to (Evaluation 4) described below. The evaluation results are shown in Table 2.

(Evaluation 4) Appearance of Coating

A 40-μm-thick coating was applied to a glass plate using the above coating composition (1) and dried at 23° C. and 50% RH for 7 days. The resulting coating was examined for 20° gloss using "haze-gloss version 3.40" (trade name) manufactured by BYK Gardner. A measured value for a standard black glass plate with a refractive index of 1.567 was defined as 100 gloss units. The 20° gloss of the glass plate alone used for the coating was measured to be 174. The rating criteria were as follows.

AAA: 160 or more
AA: 150 or more and less than 160
A: 130 or more and less than 150
B: 100 or more and less than 130
C: Less than 100

[Preparation of Coating Composition (2)]

A coating composition was prepared in the same manner as the coating composition (1), except for substituting stirring at 600 rpm for 10 minutes for stirring at 200 rpm for 3 minutes. Coating evaluation was conducted using the prepared coating composition according to (Evaluation 5) to (Evaluation 8) described below. In (Evaluation 6) to (Evaluation 8), a coating having considerably poor appearance was rated as not evaluable. The evaluation results are shown in Table 2.

(Evaluation 5) Crosslinkability of Coating

A 40-μm-thick coating was applied to a PR plate using the above coating composition (2) and dried at 23° C. and 50% RH for 24 hours. The resulting coating was immersed in acetone at 23° C. for 24 hours, after which the coating was taken out of acetone and dried. The crosslinkability of the coating was calculated by the following calculation equation.

Crosslinkability of coating (%)=(Mass of coating remaining undissolved)/(Mass of coating before acetone immersion)×100%

The rating criteria were as follows.
A: 85% or more
B: 80% or more and less than 85%
C: Less than 80%

(Evaluation 6) Hardness of Coating

A 40-μm-thick coating was applied to a glass plate using the above coating composition (2) and dried at 23° C. and 50% RH for 7 days. The hardness of the resulting coating was measured using a Konig hardness tester (manufactured by BYK Gardner under the trade name "Pendulum hardness tester"). The rating criteria were as follows.
A: 100 or more
C: Less than 100

(Evaluation 7) Solvent Resistance of Coating

A 40-μm-thick coating was applied to a glass plate using the above coating composition (2) and dried at 23° C. and 50% RH for 7 days. A 10-mm-diameter cotton ball impregnated with 1 g of xylene was left in place on the resulting coating for 10 minutes, after which xylene remaining on the surface of the coating was removed and then the state of the coating was observed. The rating criteria were as given below. It should be noted that a coating having poor appearance was rated as non-measurable since visual evaluation was impossible.
A: Transparent and undented.
B: Slightly cloudy or slightly dented.
C: Opaque or dented.

(Evaluation 8) Water Resistance of Coating

A 40-μm-thick coating was applied to a PR plate using the above coating composition (2) and dried at 23° C. and 50% RH for 7 days. The resulting coating was immersed in water at 40° C. for 4 hours, after which the coating was taken out of water and the state of the coating was observed. The rating criteria were as given below. It should be noted that a coating having poor appearance was rated as non-measurable since visual evaluation was impossible.
A: Unchanged
B: Slight cloudiness occurred.
C: Cloudiness occurred or coating was dissolved.

TABLE 2

| Coating composition | Polyisocyanate composition | (Evaluation 4) Appearance of coating | (Evaluation 5) Crosslinkability of coating | (Evaluation 6) Hardness of coating | (Evaluation 7) Solvent resistance of coating | (Evaluation 8) Water resistance of coating |
|---|---|---|---|---|---|---|
| Example 17 | Example 1 | B | A | A | B | A |
| Example 18 | Example 2 | B | A | A | B | A |
| Example 19 | Example 3 | B | A | A | A | A |
| Example 20 | Example 4 | A | B | A | B | A |
| Example 21 | Example 5 | A | A | A | A | A |
| Example 22 | Example 6 | B | A | A | B | A |
| Example 23 | Example 7 | A | B | A | A | B |
| Example 24 | Example 8 | B | B | A | B | B |
| Example 25 | Example 9 | A | A | A | A | A |
| Example 26 | Example 10 | A | A | A | A | A |
| Example 27 | Example 11 | AA | A | A | A | A |
| Example 28 | Example 12 | AAA | A | A | A | A |
| Example 29 | Example 13 | AAA | A | A | A | A |
| Example 30 | Example 14 | AA | A | A | A | A |
| Example 31 | Example 15 | AA | A | A | A | A |
| Example 32 | Example 16 | AA | A | A | A | A |
| Comparative Example 8 | Comparative Example 1 | C | A | A | C | A |
| Comparative Example 9 | Comparative Example 2 | C | A | A | C | A |
| Comparative Example 10 | Comparative Example 3 | C | A | A | C | A |
| Comparative Example 11 | Comparative Example 4 | C | A | A | C | A |
| Comparative Example 12 | Comparative Example 5 | C | A | C | Non-measurable | Non-measurable |
| Comparative Example 13 | Comparative Example 6 | C | A | A | C | A |
| Comparative Example 14 | Comparative Example 7 | C | A | A | Non-measurable | Non-measurable |

The present application is based on Japanese Patent Application (Japanese Patent Application No. 2015-020671) filed with Japan Patent Office on Feb. 4, 2015, all the contents of which are herein incorporated by reference.

The invention claimed is:

1. A polyisocyanate composition comprising a modified polyisocyanate obtained by a reaction between a polyisocyanate and a polyalkylene glycol alkyl ether represented by following general formula (1):

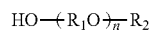

wherein $R_1$ is an alkylene group having 1 to 4 carbon atoms, $R_2$ is an alkyl group having 1 to 4 carbon atoms, and an average of n is 5.0 or more and 20 or less, wherein an average number of isocyanate functional groups in the polyisocyanate composition is 1.8 or more and 4.0 or less, a moiety derived from the polyalkylene glycol alkyl ether in the modified polyisocyanate is contained in an amount of 10 mass % or more and 18 mass % or less based on a total amount of the polyisocyanate composition, and a polydispersity index of molecular weight distribution of the moiety derived from the polyalkylene glycol alkyl ether in the modified polyisocyanate is 1.05 or more and 2.00 or less.

2. The polyisocyanate composition according to claim 1, wherein the polydispersity index of molecular weight distribution is 1.05 or more and 1.50 or less.

3. The polyisocyanate composition according to claim 2, wherein in the formula (1), $R_1$ is an ethylene group and the average of n is 5.0 or more and 15 or less.

4. The polyisocyanate composition according to claim 3, wherein the polyalkylene glycol alkyl ether comprises two or more polyalkylene glycol alkyl ethers represented by the formula (1) and differing in the average of n.

5. The polyisocyanate composition according to claim 2, wherein the polyalkylene glycol alkyl ether comprises two or more polyalkylene glycol alkyl ethers represented by the formula (1) and differing in the average of n.

6. The polyisocyanate composition according to claim 1, wherein in the formula (1), $R_1$ is an ethylene group and the average of n is 5.0 or more and 15 or less.

7. The polyisocyanate composition according to claim 6, wherein the polyalkylene glycol alkyl ether comprises two or more polyalkylene glycol alkyl ethers represented by the formula (1) and differing in the average of n.

8. The polyisocyanate composition according to claim 7, further comprising a hindered phenolic compound.

9. The polyisocyanate composition according to claim 6, further comprising a hindered phenolic compound.

10. The polyisocyanate composition according to claim 1, wherein the polyalkylene glycol alkyl ether comprises two or more polyalkylene glycol alkyl ethers represented by the formula (1) and differing in the average of n.

11. The polyisocyanate composition according to claim 10, further comprising a hindered phenolic compound.

12. The polyisocyanate composition according to claim 1, further comprising a hindered phenolic compound.

13. A coating composition comprising the polyisocyanate composition according to claim 1.

14. A coated substrate comprising a substrate and a coating film coating the substrate, the coating film being formed from the coating composition according to claim 13.

15. An aqueous coating composition comprising the coating composition according to claim 13 and water.

16. A coated substrate comprising a substrate and a coating film coating the substrate, the coating film being formed from the aqueous coating composition according to claim 15.

17. A method for producing a polyisocyanate composition, comprising a reaction step of reacting a polyisocyanate and a polyalkylene glycol alkyl ether represented by following general formula (2):

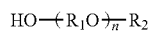
(2)

wherein $R_1$ is an alkylene group having 1 to 4 carbon atoms, $R_2$ is an alkyl group having 1 to 4 carbon atoms, and an average of n is 5.0 or more and 20 or less to obtain a polyisocyanate composition comprising a modified polyisocyanate, wherein the reaction step is performed to obtain the polyisocyanate composition in which an average number of isocyanate functional groups is 1.8 or more and 4.0 or less, a moiety derived from the polyalkylene glycol alkyl ether in the modified polyisocyanate is contained in an amount of 10 mass % or more and 18 mass % or less based on a total amount of the polyisocyanate composition, and a polydispersity index of molecular weight distribution of the moiety derived from the polyalkylene glycol alkyl ether in the modified polyisocyanate is 1.05 or more and 2.00 or less.

18. The method for producing a polyisocyanate composition according to claim 17, wherein the polydispersity index of molecular weight distribution is 1.05 or more and 1.50 or less.

19. The method for producing a polyisocyanate composition according to claim 17, wherein in the formula (2), $R_1$ is an ethylene group and the average of n is 5.0 or more and 15 or less.

20. The method for producing a polyisocyanate composition according to claim 17, wherein the polyalkylene glycol alkyl ether comprises two or more polyalkylene glycol alkyl ethers represented by the formula (2) and differing in the average of n.

* * * * *